(12) United States Patent
Brandi et al.

(10) Patent No.: US 6,853,780 B1
(45) Date of Patent: Feb. 8, 2005

(54) OPTICAL CABLE FOR TELECOMMUNICATIONS

(75) Inventors: Giovanni Brandi, Milan (IT); Enrico Consonni, Seregno (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/937,653

(22) PCT Filed: Mar. 17, 2000

(86) PCT No.: PCT/EP00/02400

§ 371 (c)(1),
(2), (4) Date: Jan. 18, 2002

(87) PCT Pub. No.: WO00/60393

PCT Pub. Date: Oct. 12, 2000

Related U.S. Application Data
(60) Provisional application No. 60/127,885, filed on Apr. 5, 1999.

(30) Foreign Application Priority Data

Mar. 31, 1999 (EP) .............................. 99106565

(51) Int. Cl.[7] ................................................. G02B 6/44
(52) U.S. Cl. ...................................... 385/104; 385/103
(58) Field of Search ......................... 385/100–113, 123, 385/124

(56) References Cited

U.S. PATENT DOCUMENTS

| | | | | |
|---|---|---|---|---|
| 4,541,970 A | | 9/1985 | Caverly, Jr. et al. | |
| 4,697,875 A | * | 10/1987 | Priaroggia | ................... 385/101 |
| 4,744,935 A | | 5/1988 | Priaroggia et al. | |
| 4,832,441 A | | 5/1989 | Barnes et al. | |
| 4,842,438 A | * | 6/1989 | Bortolin et al. | ............. 403/266 |
| 4,902,097 A | | 2/1990 | Worthington et al. | |
| 5,127,076 A | * | 6/1992 | Lepri et al. | .................. 385/111 |
| 5,418,881 A | * | 5/1995 | Hart et al. | ................... 385/123 |
| 5,440,659 A | * | 8/1995 | Bergano et al. | ............. 385/100 |
| 5,649,043 A | * | 7/1997 | Adams et al. | .............. 385/110 |
| 6,035,086 A | * | 3/2000 | Norman et al. | ............. 385/103 |
| 6,363,192 B1 | * | 3/2002 | Spooner | ...................... 385/101 |

FOREIGN PATENT DOCUMENTS

| | | |
|---|---|---|
| EP | 0 851 258 A1 | 7/1998 |
| GB | 2 303 938 A | 3/1997 |
| WO | WO 99/30191 | 6/1999 |

* cited by examiner

*Primary Examiner*—Edward J. Glick
*Assistant Examiner*—Thomas R Artman
(74) *Attorney, Agent, or Firm*—Finnegan, Henderson, Farabow, Garrett & Dunner, L.L.P.

(57) ABSTRACT

Optical cable (1) for telecommunications, having low PMD and attenuation values, said cable comprising a central element (4), a plurality of optical fibres (3) and a layer of polymer material (5) devoid of discontinuities and incorporating both the central element (4) and the optical fibres, each of the optical fibres (3) being ranged along an open helix trajectory along which it has a torsion with a mean value of zero and a local maximum value of between 0.05 turns/m and 1 turns/m.

19 Claims, 11 Drawing Sheets

OPTICAL CABLE FOR TELECOMMUNICATIONS

CROSS REFERENCE TO RELATED APPLICATIONS

This application is a national stage filing of International Application No. PCT/EP00/02400, filed Mar. 17, 2000, which published in the English language and claims priority of European Patent Application No. 60/127,885, filed on Mar. 31, 1999, and the benefit of U.S. Provisional Application No. 60/127,885, filed on Apr. 5,1999.

The present invention relates to an optical cable for telecommunications, in particular an optical submarine cable for multiple-wavelength telecommunications systems operating over long distances and at high transmission speeds.

An optical cable suitable for submarine applications typically comprises an optical core incorporating a plurality of optical fibres for the transmission of optical signals and one or more external reinforcing and protective linings. The optical core may advantageously be of the type comprising a central support element and, around it, one or more layers of polymer material in which the optical fibres are incorporated in a fixed position.

In the case of submarine applications, the cable must be able to operate under severe environmental conditions, in particular it must be able to withstand very high pressures and the action of corrosive agents. Moreover, the cable must be able to withstand high mechanical stresses, in particular tractional and flexural stresses, to which it is subjected during the operations involving laying at sea and recovery. The forces generated inside the cable as a result of these stresses may be transmitted to the optical fibres and cause negative effects in terms of attenuation of the signals transmitted.

In the past various configurations for an optical cable suitable for submarine applications have been proposed.

The patent U.S. Pat. No. 4,744,935 in the name of Societa Cavi Pirelli S.p.A proposes a cable, the structure of which preferably comprises, in the radially innermost position, a fractionally resistant cord or the like incorporated in a body of polymer material in which optical fibres arranged in a loose-type protection are embedded. These optical fibres are arranged around the cord in open helices, namely along trajectories having sections with a first winding direction alternating with sections having an opposite winding direction.

The patent application EP 851258 A1 in the name of ALCATEL ALSTHOM COMPAGNIE GENERALE D'ELECTRICITE relates to a fiber optical cable in which the fibers are helically wound around a central member and are incorporated in a coating layer that, together with the central member, define a unitary structure avoiding water penetration and propagation. The optical fibers are wound on S or SZ helixes (i.e. on closed or open helixes). The coating layer is extruded on the central member as the fiber are positioned around it. This is made by means of an extrusion die having fiber guiding holes around the central member and adapted to rotate in a single direction or alternately in both directions.

The patent U.S. Pat. No. 4,541,970 in the name of AT&T BELL LAB proposes a method for manufacturing the core of a cable for submarine communications which envisages extruding a first layer of thermoplastic elastomer around a previously heated reinforcing element, arranging the optical fibres in a helix, using a "planetary motion" technique on the first elastomer layer and extruding onto the first elastomer layer a second layer of elastomer material. Winding of the optical fibres according to the "planetary motion" technique is performed by means of an apparatus consisting of a rotating cage having, associated with it, the reels carrying the optical fibres as well as suitable guides for directing the optical fibres from the cage to the extruder. In particular, the reels for unwinding the optical fibres are supported in such a way that, when the cage rotates, their axes remain parallel to a fixed direction. With this technique, a particularly small torsion is imparted to the optical fibres.

The patent U.S. Pat. No. 4,902,097 in the name of STC PLC proposes a further technique for producing an optical cable, comprising the steps of extruding a thermoplastic elastomer layer around a central element, heating the surface beyond its melting point, incorporating a plurality of optical fibres in this surface and extruding a second thermoplastic elastomer layer so as to cover the fibres. In this case, the optical fibres are partially incorporated in the first layer and partially in the second elastomer layer. The optical fibres have a lie with a winding angle equal to zero, namely they are arranged parallel to one another and to the central axis of the cable.

The patent U.S. Pat. No. 4,832,441 in the name of STC PLC proposes an optical cable suitable for submarine applications, said cable having a central filament and a plurality of optical fibres lined with acrylate and incorporated in a layer of plastic material with a low melting point obtained using a single extrusion process, namely a so-called one-shot operation technique. In this case also, the optical fibres are arranged with a winding angle equal to zero.

The patent U.S. Pat. No. 5,440,659 in the name of AT&T Corp. proposes a method for manufacturing an optical fibre cable which envisages applying a controlled torsion to each of the optical fibres during the cabling process. The torsion applied is uniform along the whole length of the optical fibre. The optical fibres are wound in a helix onto a first layer of thermoplastic material extruded onto a central element and a further layer of thermoplastic material is extruded onto the optical fibres. In order to perform the helical winding of the optical fibres in a helix, a rotating cage similar to that used in the patent U.S. Pat. No. 4,541,970 already mentioned is used, although the reels which carry the optical fibres are either fixed to the cage itself or rotate in a controlled manner, so as to control the torsion applied to the optical fibres during the optical core manufacturing process.

The patent application GB 2,303,938 in the name of STC Submarine Systems Limited relates to an optical fibre cable and to the associated manufacturing method. The method proposed envisages extruding a thermoplastic elastomer layer around a central element, causing hardening (by means of cooling) of the elastomer layer, depositing a plurality of optical fibres along the hardened elastomer and extruding a further thermoplastic elastomer layer on top of the optical fibres. The optical fibres may be twisted around their own axes and/or wound in a helix around the first layer prior to extrusion of the additional layer. This twisting and/or winding operation may be continuous or may be alternated at a predetermined angle.

The technique of depositing the optical fibres onto a layer of hardened elastomer will be referred to below, for the sake of convenience of the description, as a "tangential deposition technique".

The Applicant has noted that the cables manufactured using the known methods described above have problems in terms of signal attenuation and/or in terms of polarisation mode dispersion ("PMD").

Optical power attenuation of the signals inside the optical fibres is a problem of particular importance in long-distance optical telecommunications systems. In such systems, in order to ensure correct signal reception, it is necessary to use signal amplifiers arranged at predetermined distances from one another (for example at distances of a few hundreds of kilometers). These signal amplifiers are typically optical amplifiers of the active-fibre type, preferably with a substantially flat amplification band in the transmission band. In a multiple-wavelength telecommunication system, since the attenuation affecting the signal in the optical cable depends on the wavelength, the amplifiers of the telecommunications system generally receive a non-equalized signal. In order to overcome this drawback, it is known to use signal equalizers arranged, for example, in the amplifiers themselves or along the line so as to equalize the optical power in the various transmission channels (each channel having a respective wavelength associated with it).

As is known, in order to be able to obtain correct equalization, it is necessary for the spectral attenuation curve of the optical fibre to have, in the transmission band, a substantially constant and predictable inclination. Generally, in a cable for optical telecommunications, attenuation of the transmitted signals depends on the state of the forces present inside the cable, generated, for example, during the manufacturing process, during unwinding of the cable or during the operations performed on the cable itself. Moreover, attenuation of the signals increases when micro-bendings of the optical fibres are present inside the cable itself.

The Applicant has noted that cables of the type comprising two layers of extruded material and a plurality of optical fibres arranged on the first layer, using the tangential deposition technique (as described in the already mentioned patent application GB 2,303,938) may pose problems relating to attenuation on account of the effects of micro-bending of the optical fibres. The Applicant has, in fact, noted that, during extrusion of the second layer onto the first layer, micro-cavities of air may form between the optical fibres and the first extruded layer. The presence of these micro-cavities may result in local displacement of the optical fibres and, therefore, may produce micro-bending of the fibres themselves. Since, as already mentioned, micro-bending causes an attenuation of the transmitted signals and since this attenuation depends on the wavelength, the spectral attenuation curve is subject to a not insignificant variation compared to the attenuation curve of the optical fibres prior to cabling. This variation in the spectral attenuation curve due to cabling constitutes a drawback since it introduces an element of unpredictability with regard to the transmission performance of the system which cannot be accounted for during the actual system design stage. Therefore, a significant variation in the attenuation curve following cabling may result in an undesirable behaviour of the system in terms of signal attenuation and result in inefficient equalization of the signals in the system itself.

The Applicant has noted that optical cables may also have problems associated with PMD. The PMD of a signal transmitted in an optical fibre arises from the difference in group speed at which orthogonal modes of the signal itself are propagated. In the case of a digital signal, this difference causes spacing out of the transmitted bits with a consequent deterioration in the signal.

The PMD in a cabled optical fibre depends on the variations in form affecting the optical fibre as a result of the cabling process. Generally, if an optical fibre has been locally subjected to a stress, a local delay between the orthogonal propagation modes is produced in this zone. The summation of the delays introduced along the optical fibre determines the PMD.

In greater detail, the Applicant has noted that, during the various stages of the cabling process, radial stresses are imparted inside the cable and extend over the whole length of the cable itself and may cause deformations in the cross-section of the optical fibres. In particular, during the process of production of the optical core, the latter has, "frozen" inside, tensions which result in a state of continuous radial stress which is essentially distributed uniformly, in an angular direction, over the cross-section of the optical core itself. This stressed state causes deformation of the optical fibres and, therefore, an increase in PMD. A similar effect is caused by the radial stresses produced during subsequent processing as well as during pressurization of the optical core during the usual application of a polyethylene sheath.

The Applicant has noted that a further factor contributing to the increase in the PMD due to the cabling consists in the geometric manufacturing defects, in particular ovalisation of the external reinforcing and protective linings.

In this case, the stresses act radially, but are not uniformly distributed in the angular direction since they act mainly in the lateral portion of the cable where the deformations are concentrated. These stresses may act on the optical fibres in a continuous or periodic manner, depending on whether the fibres are arranged parallel to each other or are wound around the central element. In this latter case, the effect of the stresses may depend on the periodic rate of winding the optical fibres themselves.

The Applicant has noted that, in the case of cables of the type where the optical fibres are incorporated partly in a first layer and partly in a second polymer layer (as described in the patent U.S. Pat. No. 4,902,097 cited above), the stresses acting on the optical fibres during extrusion of the second layer are such as to cause a constant lateral pressure on the optical fibres, with a consequent deterioration in the PMD-related transmission characteristics.

Generally moreover, the Applicant has noted that, on account of the different extrusion and cooling conditions affecting the materials of the two layers and owing to the presence of possible imperfections in the surface or in the form of the innermost layer after extrusion thereof, the extrusion technique involving two successive stages typically results in the presence of forces in the zone occupied by the optical fibres. These forces may be also increased by the phenomenon of shrinkage of the extruded material which occurs during cooling of the material itself or during cooling which follows high-temperature deposition of a lining outside the optical core.

The only type of cable, from among those cited, which has a single layer of polymer material is that described in the already cited patent U.S. Pat. No. 4,832,441, in which the fibres are arranged parallel to each other. The arrangement of the fibres parallel to each other (as also described in the already cited patent U.S. Pat. No. 4,902,097) represents a disadvantage in terms of PMD since, in this configuration, the optical fibres are generally in a constant state of stress. In fact, the stresses present during the manufacturing process and during laying of the cable, as well as those due to external agents, always act along the same generatrix of each optical fibre. This optical fibre therefore becomes birefringent and there is therefore a deterioration in performance in terms of the PMD.

The Applicant has noted that, in the case where the optical fibres are wound in a helix but without torsion (as described, for example, in the already cited patent U.S. Pat. No. 4,541,970), i.e. with one of its generatrices always directed in the same direction, the abovementioned problems due to stresses are less evident, but still tend to increase the PMD. In this case, in fact, the stresses act on the same generatrix in a periodic manner and still cause birefringence along sections of the optical fibres (although to a lesser extent compared to parallel fibres) with a consequent increase in the PMD.

If winding of the optical fibres is of the "closed" helix type, i.e. is always directed in the same direction (as described, for example, in the already cited patent U.S. Pat. No. 5,440,659 in the name of AT&T) and is associated with a non-zero torsion of the optical fibres, the Applicant has noted that there is a further disadvantage in terms of PMD. This type of winding, in fact, gives rise to the presence, in each optical fibre, of an elastic torsion which generates photoelasticity and birefringence and consequently tends to increase the PMD. This phenomenon is described, for example, in the article by A. J. Barlow, D. N. Payne, M. R. Hadley, R. J. Mandsfield, "Production of single-mode fibres with negligible intrinsic birefringence and polarisation mode dispersion", ELECTRONIC LETTERS, Vol. 17, N. 20, $1^{st}$ Oct. 1981, pp. 725–726, in which, in column 1, penultimate paragraph, it is pointed that a torsional stress is present in an optical fibre undergoing twisting after spinning and this results in a high circular birefringence due to the photoelastic effect.

If, moreover, the angle of torsion of the optical fibres is set so that it is equal to the winding angle of the fibres themselves around the central element (as suggested in the above-mentioned patent U.S. Pat. No. 5,440,659), each optical fibre is exposed to radial stresses always along the same generatrix and this results in a not insignificant increase in the PMD. Even when this condition is not present (i.e. in the case of an angle of torsion different from the winding angle), the fact of having a "uniform" winding (namely a constant winding speed) nevertheless results in a periodic nature of the stresses along the same generatrix of an optical fibre. Finally, the abovementioned winding in the form of a closed helix with twisting results in a continuous mechanical stress along the optical fibres which may cause structural weakening of the fibres themselves.

According to the present invention, a fiber optic cable is proposed, having an optical core in which optical fibres are wound along "open" helix trajectories, entirely incorporated in a layer of polymer material devoid of discontinuities and having a torsion chosen so that the PMD measured on said cable is less than 110% of the PMD measured on a non-cabled optical fibre of the same type. In particular, the maximum local torsion of the fibres is between 0.05 turns/m (or twists/m) and 1.5 turns/m, preferably between 0.1 turns/m and 1 turn/m.

The layer of polymer material is devoid of discontinuities since it is obtained using a single extrusion process.

Hereinbelow an "open" helix trajectory or "SZ" trajectory is understood as meaning a trajectory along a cylindrical surface resulting from the combination of the translatory movement in a direction parallel to a central axis with an alternate rotary movement about the axis itself. Basically, this type of trajectory is different from a "closed" helix trajectory since the winding around the central axis is not always performed in the same direction, but alternately in a clockwise direction and anti-clockwise direction.

With the cable manufactured in accordance with the invention the drawbacks associated with optical cores in which the fibres are arranged between two extruded layers of polymer material are eliminated. In fact, in terms of signal attenuation, the presence of a single layer of polymer material eliminates the problem of micro-bending of the optical fibres present in the optical cores produced using the tangential deposition technique. In terms of PMD, the particular arrangement of the optical fibres results in a reduction in the drawbacks described above with reference to the configurations consisting of fibres arranged parallel and in a "closed" helix The Applicant has found in particular that the arrangement of the optical fibres on "open" helixes with local predetermined torsion inside a single layer of polymer material represents a particularly advantageous condition as regards the PMD. In fact, this configuration results in a high random distribution of the stresses acting on the cable over the surface of the optical fibres and, therefore, in a reduction in the differences in orthogonal mode group speed of the signal. Moreover, owing to the presence of an alternate helix, it is possible to reduce the intrinsic PMD of the optical fibre dependent on the geometric imperfections of its core, without at the same time negatively influencing the photoelastic effects which, as already mentioned, may lead to increases in the PMD.

The process for production of the cable according to the invention, which also forms the subject of the present invention, is particularly simple and quick since it requires a single extrusion process for manufacture of the optical core and is, moreover, particularly low-cost since it does not require complex machinery such as the cage of the "planetary motion" technique.

According to a first aspect, the present invention relates to a method for the manufacture of an optical cable, comprising the step of incorporating at least one optical fibre in an extruded polymer material in contact with a strand-like element, characterized in that said step of incorporation in a polymer material comprises the steps of:

arranging said optical fibre along an open helix trajectory, and applying to said optical fibre a maximum local torsion of between 0.05 turns/m and 1.5 turns/m, and preferably of between 0.1 turns/m and 1 turn/m.

Preferably, a zero mean torsion is applied to said optical fibre.

Said step of incorporation in a polymer material comprises preferably the steps of:

feeding said strand-like element through an extrusion zone in a predetermined feeding direction;

feeding through said extrusion zone said optical fibre at a predefined distance from said strand-like element; and supplying into said extrusion zone said polymer material so that said polymer material incorporates said strand-like element and said optical fibre.

Preferably, a number of optical fibres ranging between 2 and 24 are incorporated in said polymer material.

Preferably, said step of arranging each of said optical fibres along an open helix trajectory comprises a step of imparting an alternate twist to said strand-like element.

Said step of feeding said optical fibre through said extrusion zone may comprise the steps of torsionally constraining said optical fibre upstream of said extrusion zone at a predetermined distance from said extrusion zone and said step of applying, to said optical fibre, a maximum local torsion comprises the step of adjusting said distance of said constraint from said extrusion zone in relation to said maximum local torsion.

Preferably, said step of imparting an alternate twist to said strand-like element comprises the step of imparting to said strand-like element a predetermined angular speed and a predetermined maximum angle of torsion and said step of feeding said strand-like element comprises the step of translating said strand-like element at a predetermined feed speed, said step of applying a maximum local torsion to said optical fibre comprising the step of adjusting said angular speed, said maximum angle of torsion or said feed speed in relation to said maximum local torsion.

Said step of arranging said optical fibre along an open helix trajectory preferably comprises the step of associating a spatial inversion pitch of between 0.5 m and 5 m with said trajectory.

Moreover, said step of feeding said optical fibre into said extrusion zone preferably comprises the step of conveying said optical fibre towards said extrusion zone by means of a support provided with channels and having said strand-like element passing through it centrally.

According to a second aspect thereof, the present invention relates to an optical cable for telecommunications, comprising a substantially strand-like central element, at least one optical fibre and a layer of polymer material which is substantially devoid of discontinuities and incorporates said central element and said optical fibre, said optical fibre being arranged along an open helix trajectory and having a torsion chosen so that the PMD measured on said cable is less than 110% of the PMD measured on said non-cabled optical fibre of the same type.

The expression "layer substantially devoid of discontinuities" is understood as meaning a layer in which there are no separation surfaces such as those due to successive and/or separate extrusion of material (even .of the same type), differences in crystal structure or differences in stress within the material.

Said optical fibre has, along the respective open helix trajectory, a maximum local torsion preferably of between 0.05 turns/m and 1.5 turns/m and, more preferably, of between 0.1 turns/m and 1 turn/m.

Moreover, said optical fibre has, along the respective open helix trajectory, a mean torsion preferably equal to zero.

Said cable comprises preferably a number of optical fibres ranging between 2 and 24.

Preferably, said optical fibre has, along the respective open helix trajectory, a maximum winding angle less than or equal to, in terms of absolute value, 360° and a maximum angle of torsion less than, in terms of absolute value, said maximum winding angle.

Said maximum angle of torsion is preferably between 90° and 270°.

Preferably, said optical fibre has a thickness of homogeneous polymer material greater than or equal to 0.10 mm.

Said open helix trajectory has preferably an inversion pitch of between 0.5 m and 5 m.

Said cable preferably comprises a plurality of optical fibres defining a ring of optical fibres which are equidistant from each other and arranged at the same distance from an axis of said cable.

Said distance of said optical fibres from said axis ranges between 0.4 mm and 1.2 mm.

Alternatively, said cable may comprise a plurality of optical fibres defining a first ring of optical fibres which are equidistant from each other and arranged at a first distance from an axis of said cable and a second ring of optical fibres which are equidistant from each other and arranged at a second distance from said axis which is greater than said first distance.

In this case, preferably said first distance is between 0.4 mm and 0.8 mm and said second distance is between 0.9 mm and 1.2 mm.

Said layer of polymer material has a thickness preferably of between 0.9 mm and 1.5 mm.

Said central element has a diameter preferably of between 0.5 mm and 0.7 mm.

Said optical fibre has an external diameter preferably less than 400 $\mu$m and, more preferably, less than 270 $\mu$m.

Preferably, said polymer material has a bending modulus of between 20 Mpa and 70 Mpa, a Shore D hardness factor of between 15 and 70 and a Melt Flow Index of between 5 and 15.

Preferably, said cable comprises a sheath arranged around said layer of polymer material, said sheath being made of a material chosen from the group comprising polyalkylene terephthalates, polyolefins and polyamides.

Further information regarding the invention may be obtained from the following description relating to a non limiting example of embodiment, with reference to the accompanying drawings, in which.

Figure 6:
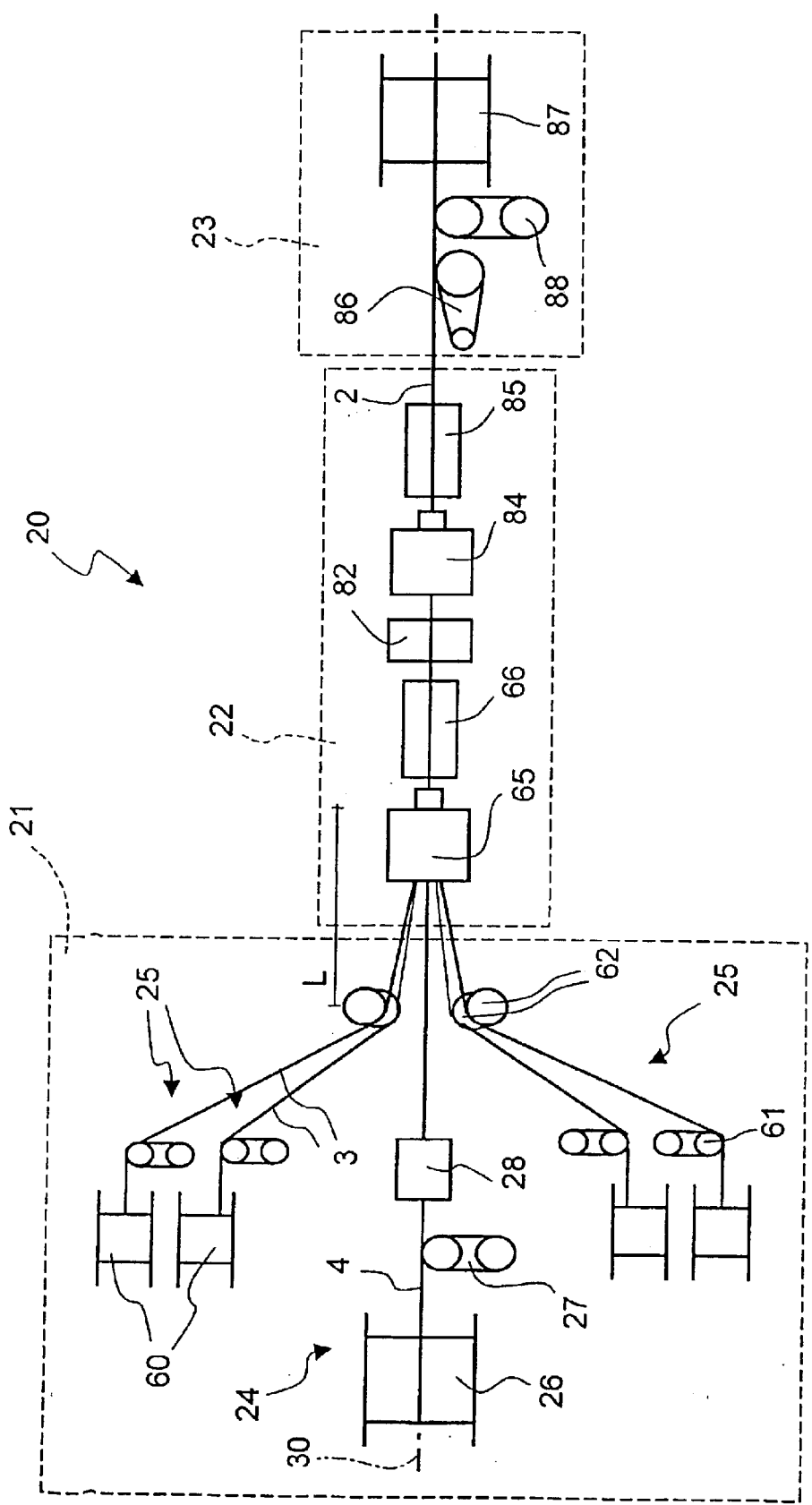
FIG. 6 shows, in schematic form, an apparatus for the production of an optical core according to the method of the invention.
Figure 7:
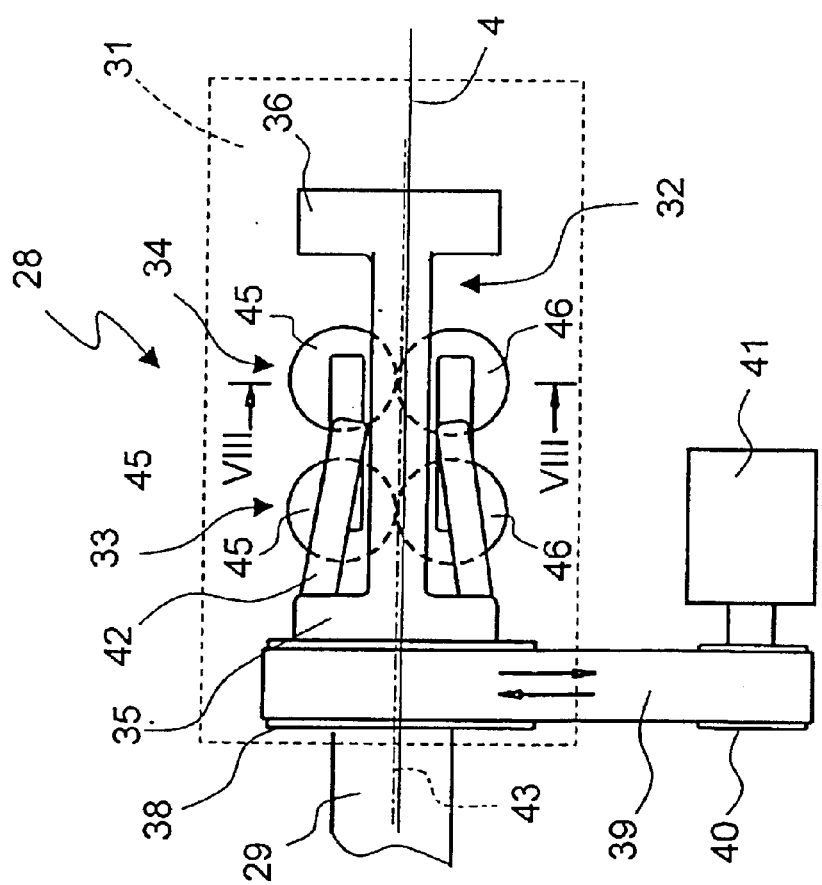
FIG. 7 shows schematically a device forming part of the apparatus according to FIG. 6.
Figure 9:
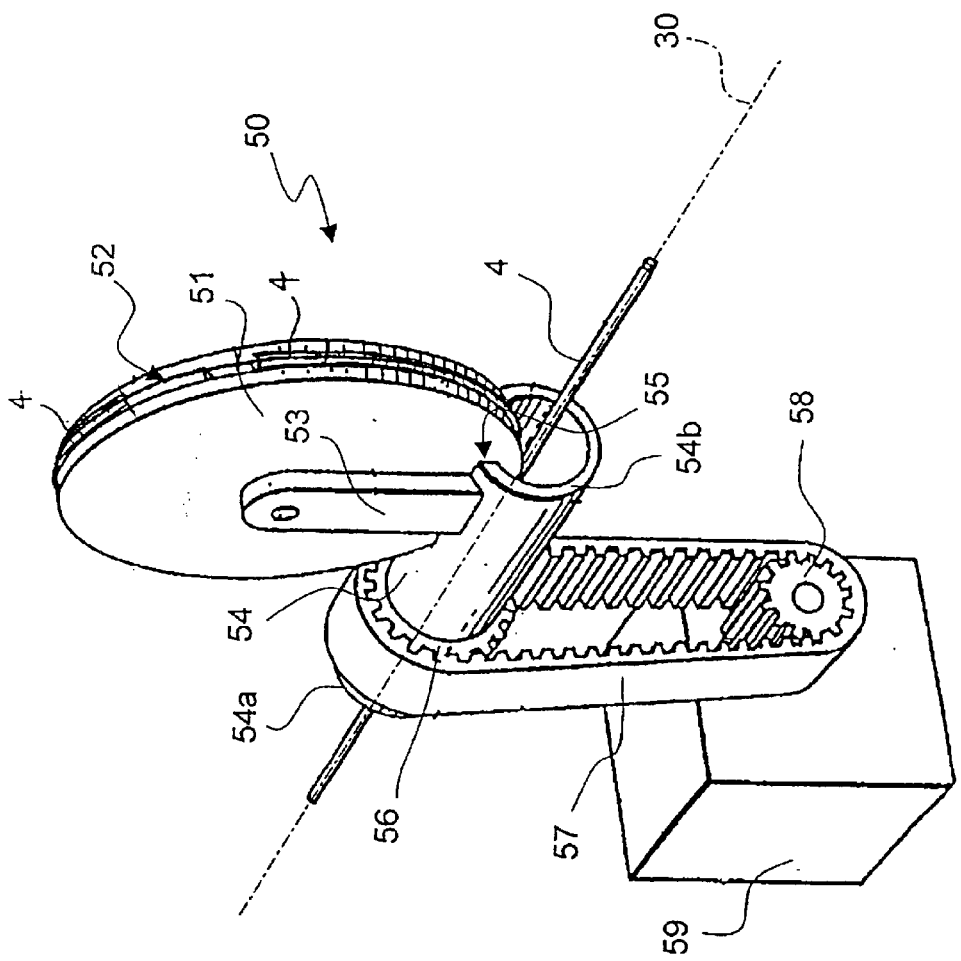
Figure 15:
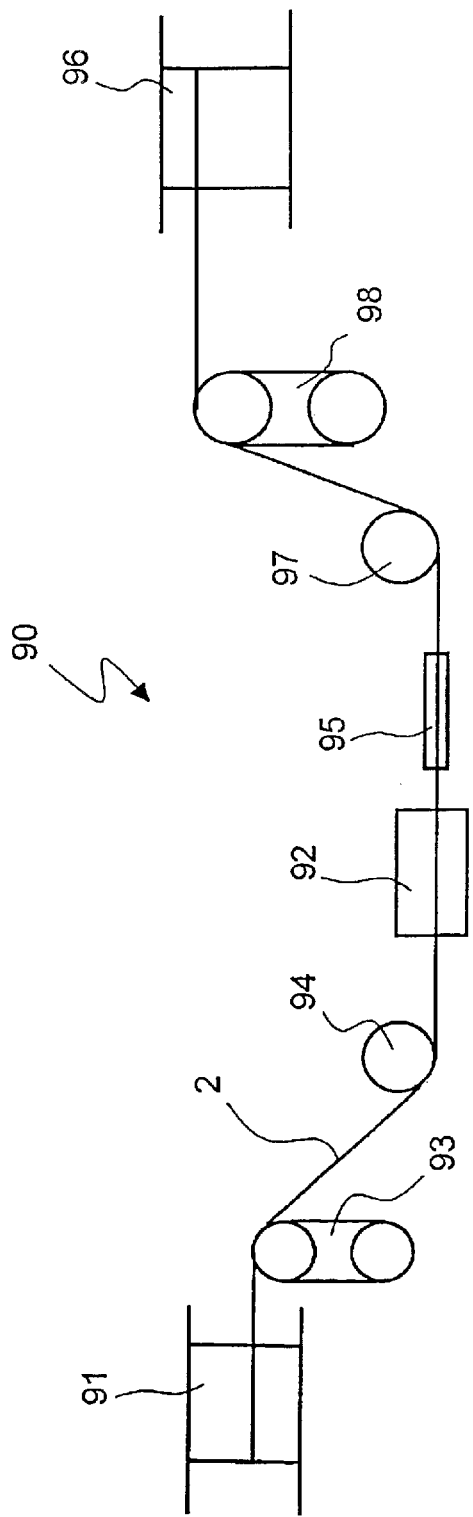
Figure 10:
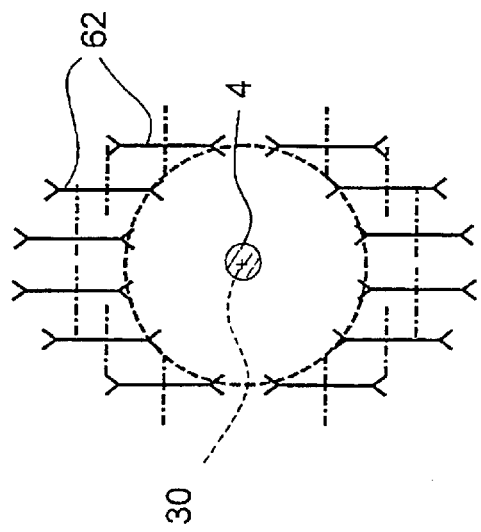
Figure 11:
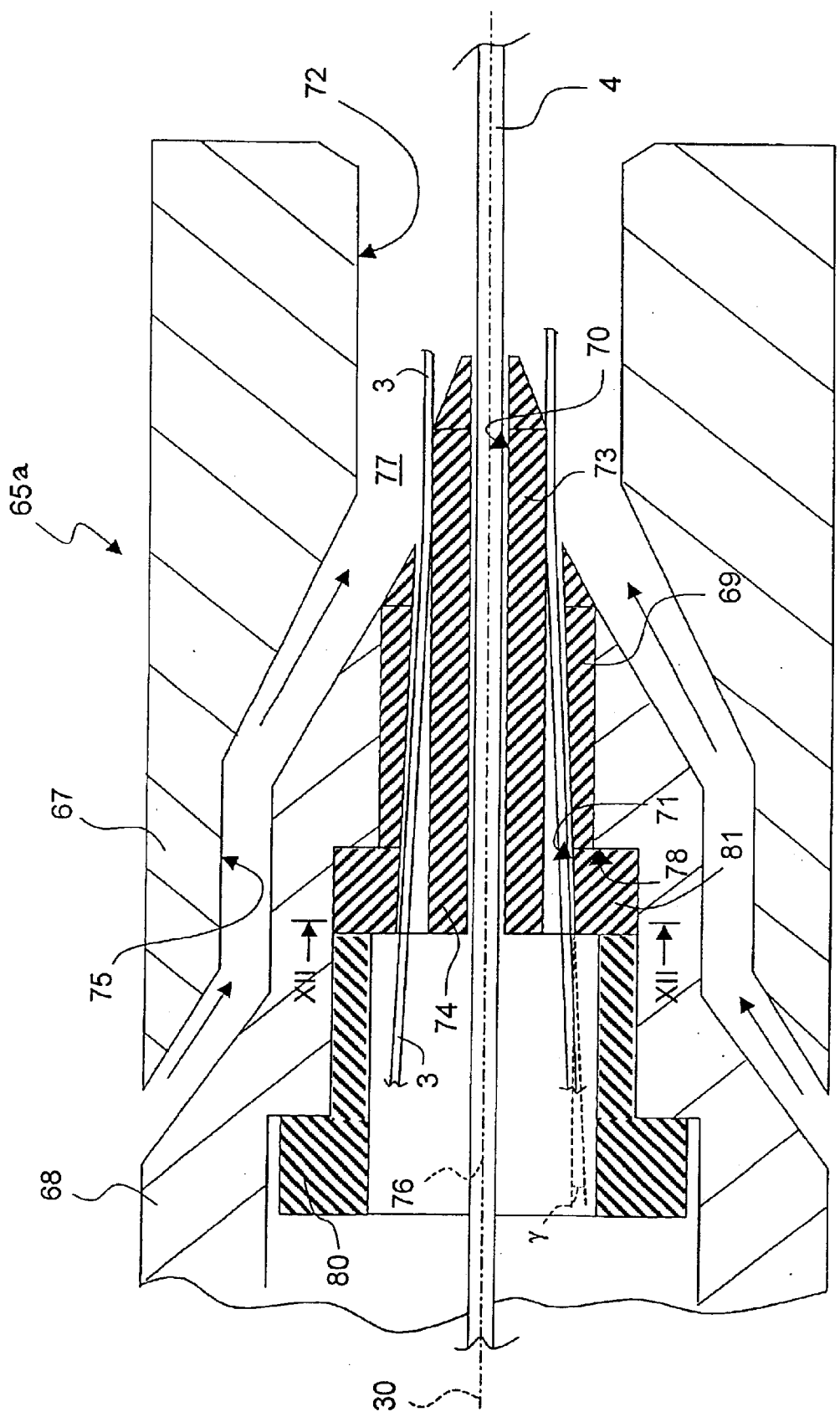
Figure 14:
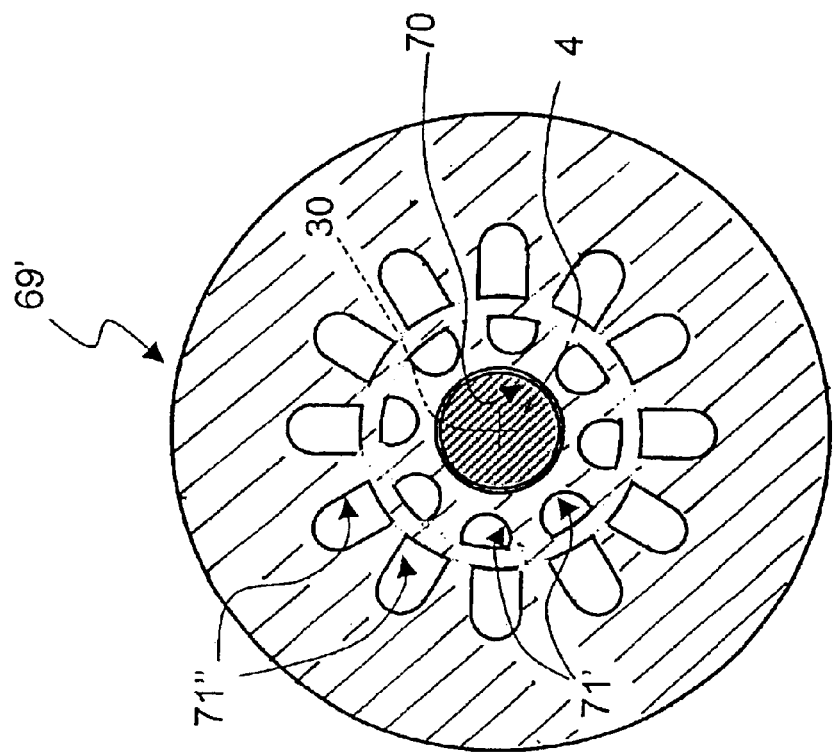
Figure 12:
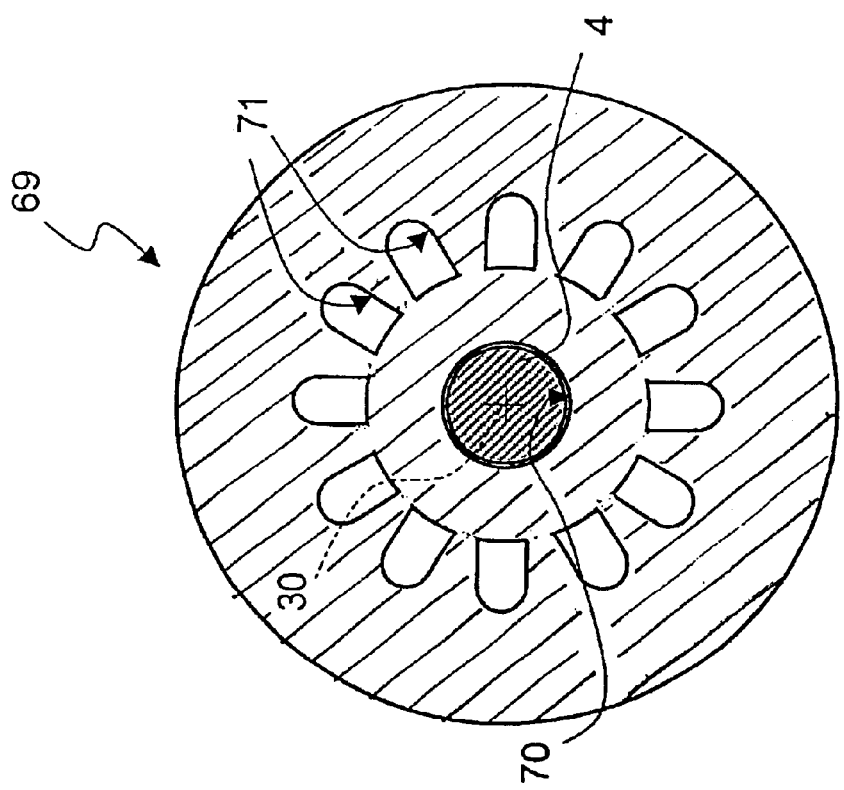
Figure 13:
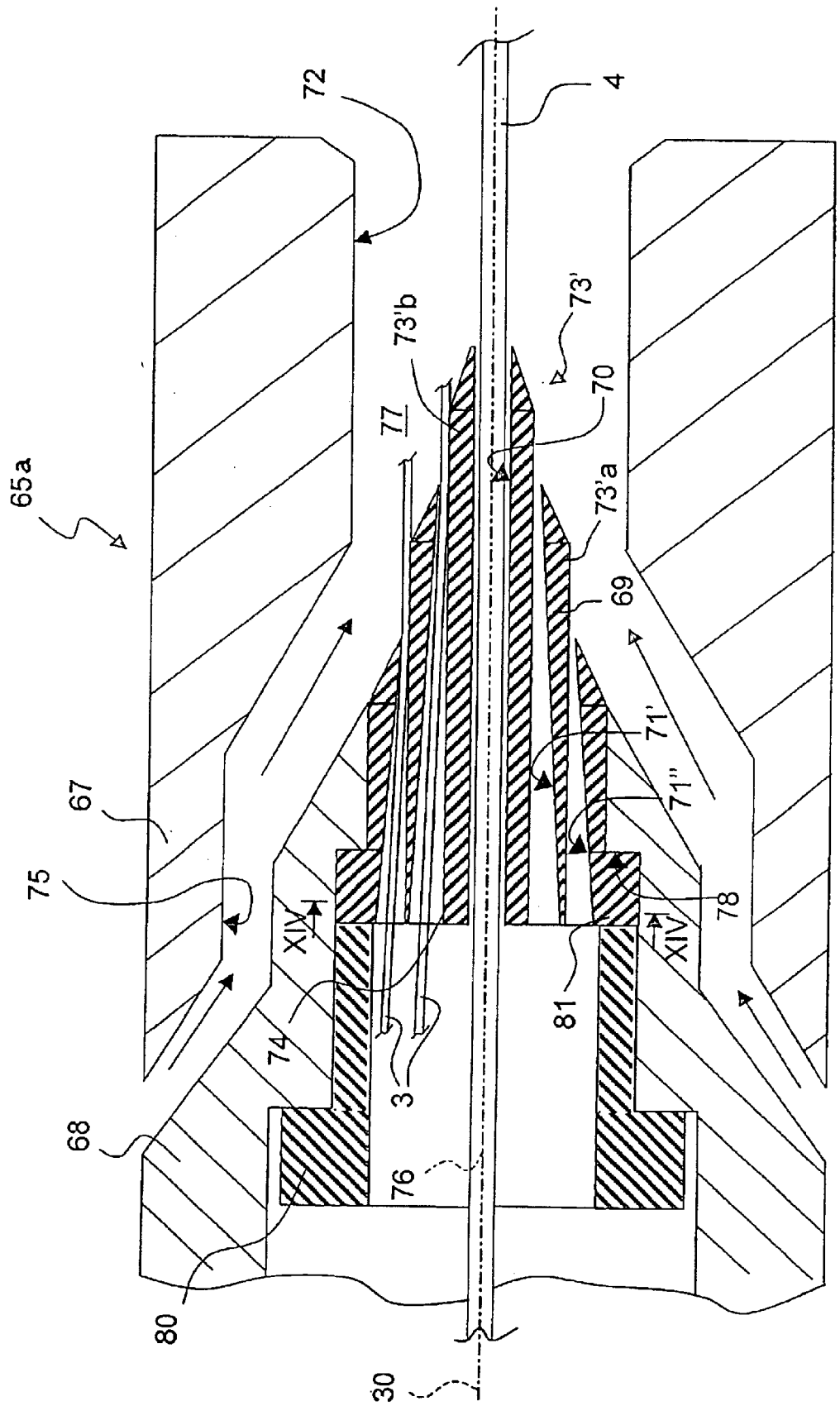
Figure 16:
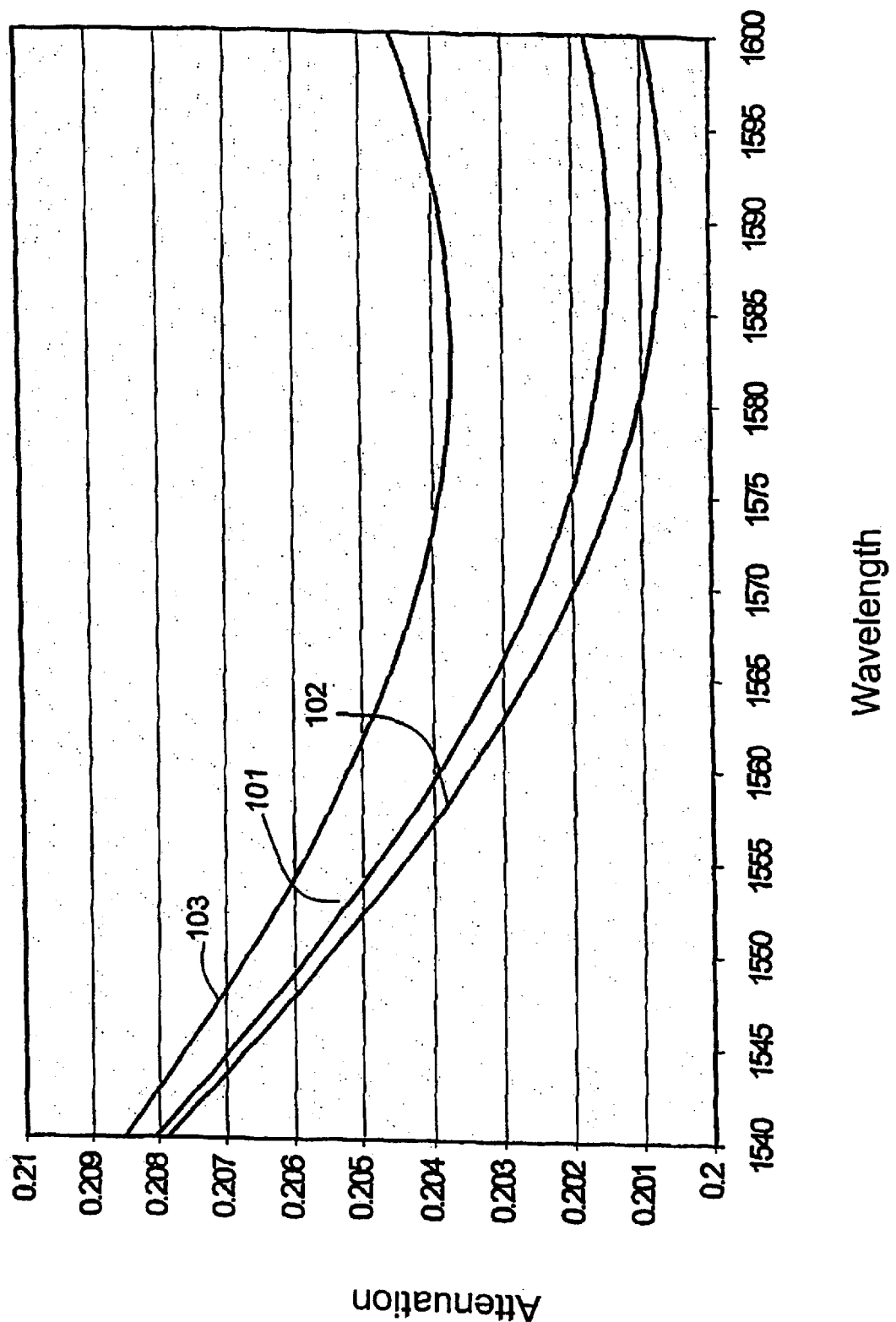

FIG. 9 relates to an additional device designed to be uses in the apparatus according to FIG. 6 in place of the device according to FIG. 7;

FIG. 10 shows, in schematic form, the arrangement, in a predetermined processing direction, of a plurality of drive pulleys used in the apparatus according to FIG. 6;

FIG. 11 shows, in schematic form, a longitudinal cross-section through part of an extruder used in the apparatus according to FIG. 6;

FIG. 12 shows, not to scale, a detail of FIG. 11 along t view XII—XII;

FIG. 13 shows, in schematic form and in longitudinal sec a possible variant of the extruder part according to FIG. 11;

FIG. 14 shows a detail of FIG. 13 along the view XIV—XIV;

FIG. 15 shows, in schematic form, a further apparatus used for simulating the effects of subsequent cabling steps on an optical core manufactured using the apparatus according to FIG. 6 prior to carrying out PMD measurements, and FIG. 16 shows the results of experimental tests carried out on a cable manufactured according to the invention.

Figure 1:
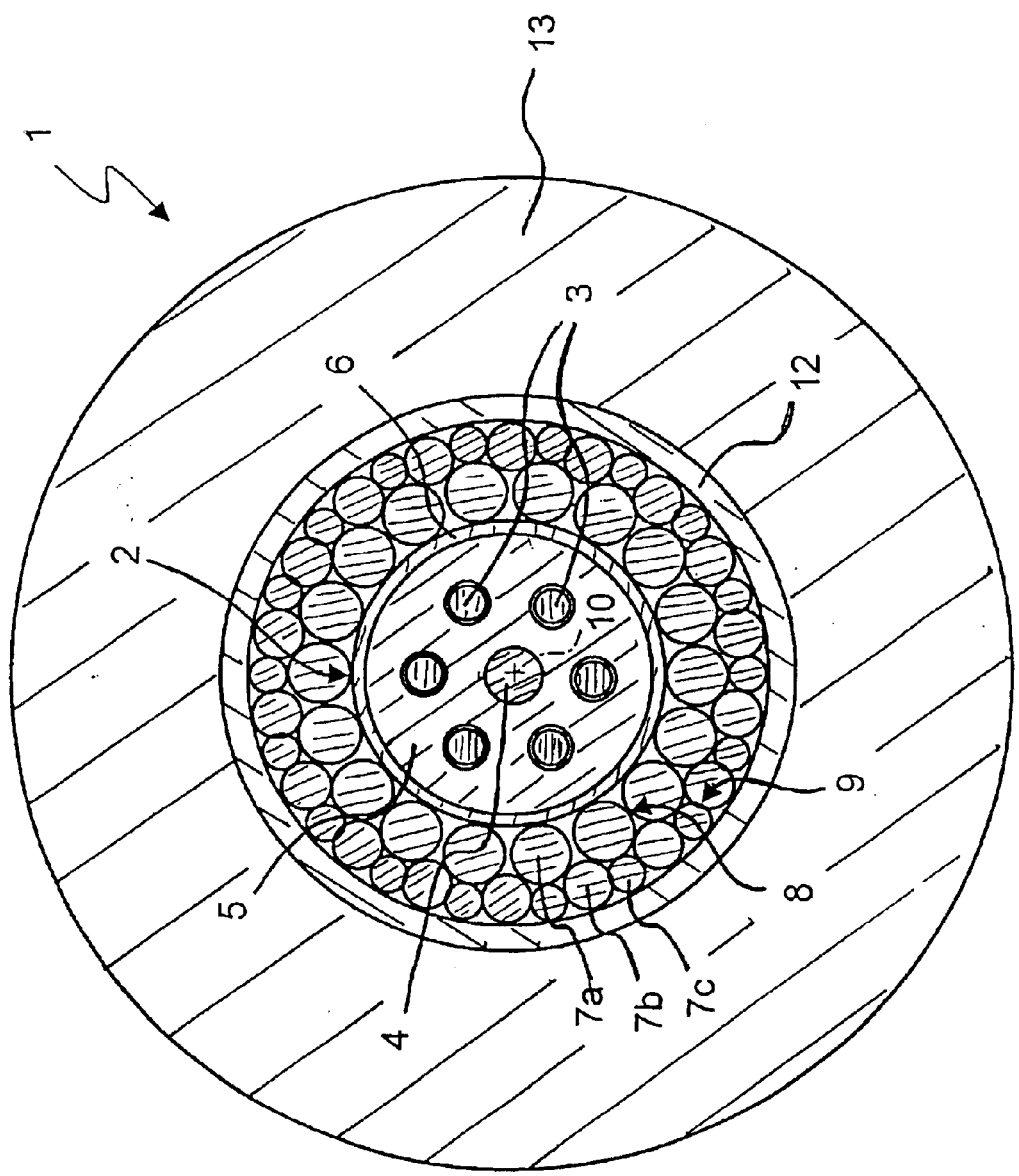
FIG. 1 shows, with parts not to scale, a cross-section through an optical cable manufactured in accordance with the invention.

FIG. 1 shows a cross-sectional view of an optical submarine cable 1 for telecommunications.

The cable 1 has an axis 10 and comprises centrally an optical core 2 which is substantially cylindrical and, around it, a plurality of protective and reinforcing elements or layers 7, 12 and 13.

The optical core 2, which will be described in detail below with reference to FIG. 2, comprises a central reinforcing element 4, a polymer layer 5 devoid of discontinuities, a plurality of optical fibres 3 (being six in number in the particular example shown) incorporated in the layer 5 and a thin sheath 6 which is made of a thermoplastic polymer and lines the layer 5. The optical core 2 has an external diameter which is preferably less than 4 mm.

A plurality of reinforcing elements 7a, 7b and 7c, preferably strand-like elements made of steel, are provided around the sheath 6. In the example shown in FIG. 1, this plurality of reinforcing elements comprises:

a first group of reinforcing elements 7a having a first diameter and arranged in mutual contact so as to provide a self-supporting structure which defines a first reinforcing layer 8 outside the sheath 6 and not in contact with the latter;

a second group of reinforcing elements 7b having a second diameter which is smaller than that of the first group and arranged outside the elements of the first group 7a; and a third group of reinforcing elements 7c which have a third diameter smaller than that of the second group and are arranged outside the elements of the first group 7a and alternated with the elements of the second group 7b so as to define, together with the latter, a second reinforcing layer 9 outside the reinforcing layer 8.

The reinforcing elements 7c are arranged in an angular position corresponding to that of the reinforcing elements 7a so that the second reinforcing layer 9 has a substantially cylindrical external envelope tangential both to the reinforcing elements 7b and to the reinforcing elements 7c.

The assembly consisting of the two reinforcing layers 8 and 9 defines a structure known in the art as a "Warrington" structure.

A tubular lining 12, which is preferably made of metallic material and more preferably of copper, surrounds the reinforcing elements 7b, 7c of the second reinforcing layer 9 and, together with the abovementioned "Warrington" structure, defines a reinforcing structure having mechanical characteristics such as to provide the cable 1 with a high resistance to mechanical stresses, in particular to the hydrostatic pressure present in deep sea zones. Moreover, the lining 12 defines an electrically conductive element which can be used for electrically supplying signal repeaters arranged in the telecommunications system of which the cable 1 forms a part. Finally, the lining 12 allows the innermost part to be protected from moisture.

Alternatively, the reinforcing elements may be arranged in other configurations, i.e. in one or more rows, depending on the conditions of use.

The cable 1 comprises, moreover, a layer 13 of polymer material, preferably polyethylene, which is arranged outside the lining 12 and designed to provide an electrical insulation with respect to the exterior.

Where further linings are not present, the external diameter of the layer 13 also defines the external diameter of the cable 1. The layer 13 may, if necessary, be protected by a metal-strip lining (not shown) or by one or more linings of the polymer type (not shown) outside the metal-layer lining.

The cable 1 described above is typically designed to be used up to a maximum depth, at sea, of about 7000 m. In some cases, for example when used in shallow seawater where fishing activities are performed, the cable 1 may be provided with an external armouring (not shown) consisting of one or more layers of cylindrical reinforcing elements which are preferably made of steel and alternated with layers of polymer material, for example polypropylene.

Figure 2:
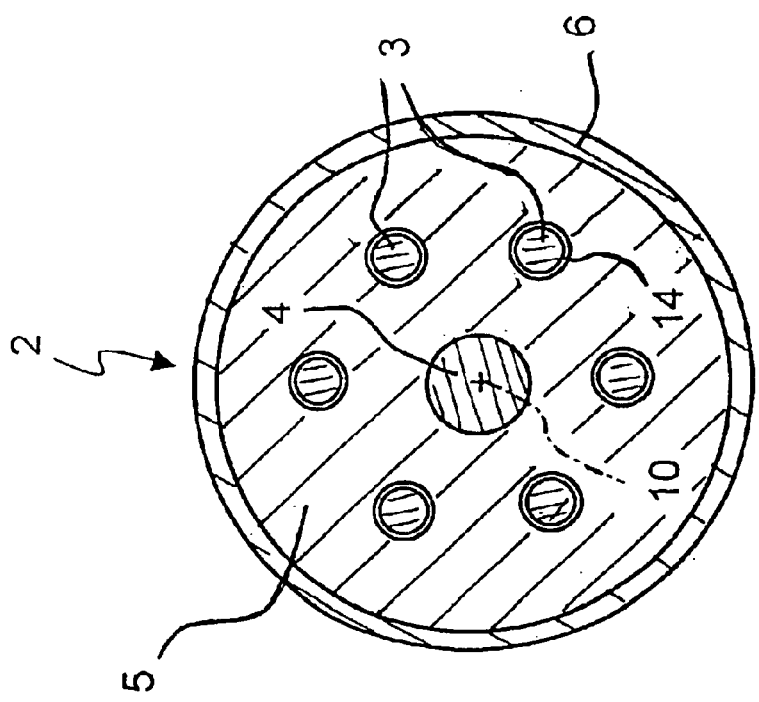
FIG. 2 shows, schematically, a cross-section through an optical core forming part of the cable according to FIG. 1.

In FIG. 2 the optical core 2 is shown isolated and on a larger scale. The central element 4 is a substantially strand-like element which is designed to ensure adequate resistance to the axial stresses during the different stages of production of the cable 1. The central element 4 is preferably made of steel or a resin reinforced with glass fibres, using reinforcing polymer materials (such as aromatic polyamides, for example "kevlar"®) or using carbon fibres or the like and has a diameter preferably of between 0.5 mm and 0.7 mm.

The polymer layer 5 defines a continuous support medium for the optical fibres and is designed both to keep the optical fibres 3 themselves in a stable position around the central element 4 and to "absorb" external stresses acting on the optical core 2. The polymer layer 5 is devoid of discontinuities since it is made using a single extrusion process and may be made of a thermoplastic resin, for example an elastomeric polyester. In order to ensure suitable mechanical protection for the optical fibres 3, this material is chosen with a bending modulus (measured in accordance with the standard ASTM D790) preferably of between 20 Mpa and 70 Mpa, and more preferably equal to about 35 Mpa, and a Shore D hardness factor preferably of between 15 and 70 and, more preferably, equal to about 35. Moreover, this material has a Melt Flow Index preferably of between 5 and 15 so as to obtain, during the extrusion process described below, correct distribution thereof around the central element 4 and the optical fibres 3 and, at the same time, reduce the stresses on the optical fibres 3 themselves. The polymer layer 5 has a thickness (defined between the central element 4 and the sheath 6) preferably of between 0.9 mm and 1.5 mm, so as to achieve adequate protection.

The sheath 6 performs a thermal and mechanical protective function and is made of a material chosen preferably from the group comprising polyalkylene terephthalates, polyolefins and polyamides, for example a polybutylene terephthalate, a polyethylene, polypropylene or nylon. The sheath 6 has a thickness preferably of between 0.05 mm and 0.15 mm.

The optical fibres 3 are of the type having, outside the light-guiding glass structure (typically consisting of a core or a cladding), a typically UV crosslinked protection made of acrylic resin and formed on one or more layers (the outermost one of which is usually coloured so as to facilitate identification of the optical fibres 3) and have an external diameter preferably less than 400 μm and, more preferably, less than 270 μm. In the example according to FIG. 2, the optical fibres 3 are arranged equidistant from each other and at the same distance from the axis 10 preferably of between 0.4 mm and 1.2 mm, so as to define a single ring of optical fibres 3. The optical fibres 3 arranged in a single ring preferably consist of a number less or equal to twelve (12)., In the variation shown in FIG. 3, relating to an optical core 2' comprising a large number of optical fibres 3, the optical fibres 3 themselves are arranged so as to define a first ring 15 and a second ring 16 outside the first ring. In the example shown, the first ring 15 comprises eight optical fibres 3 and the second ring 16 comprises twelve optical fibres 3. The optical fibres 3 of the first ring 15 are arranged at a distance from the axis 10 preferably of between 0.4 mm and 0.8 mm and the optical fibres 3 of the second ring 16 are arranged at a distance from the axis 10 preferably of between 0.9 mm and 1.2 mm. Moreover, the minimum distance between the optical fibres 3 of the first ring 15 and the optical fibres 3 of the second ring 16 is preferably between 0.15 mm and 0.3 mm. The optical fibres arranged in two rings preferably consist of a number less than twenty-four (24).

For each of the possible configurations considered here, the distance of each optical fibre 3 from the central element 4, from the sheath 6 and from the optical fibres 3 adjacent to it, is preferably greater than or equal to 0.1 mm so that a thickness of homogeneous polymer material equal to this distance is present around each optical fibre 3, so as to ensure the desired protection.

Figure 4:
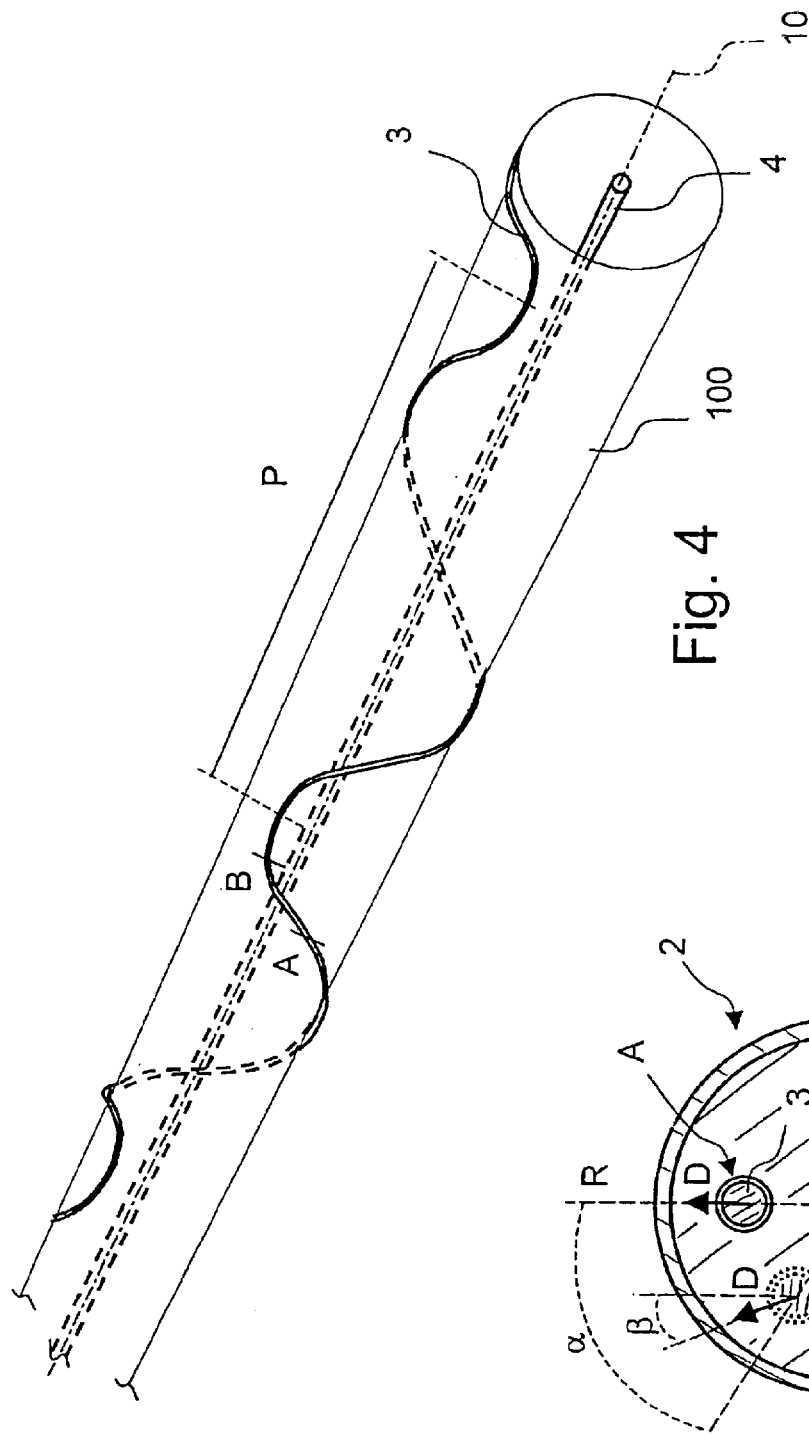
FIG. 4 shows, in schematic form, the trajectory of one of the optical fibres inside the optical core of the cable according to FIG. 1.

FIG. 4 shows the trajectory of one of the optical fibres 3 inside the optical core 2 or the optical core 2'. In order to illustrate more clearly this trajectory, FIG. 4 also shows a cylindrical surface 100 over which the trajectory itself extends. The surface 100 has been introduced solely for illustrative purposes and does not correspond to any real delimiting surface. As shown in FIG. 4, the trajectory of each optical fibre 3 is a trajectory in the form of an "open" cylindrical helix (or SZ trajectory). Along this SZ trajectory the direction of winding is inverted, in either direction, upon reaching a predetermined winding angle, preferably less than or equal to 360°. The SZ trajectory has, associated with it, an inversion pitch P, defined as being the distance between two successive points where there is an inversion in the direction of rotation, and a winding interval p, defined as being the distance between two successive points where the trajectory starts to rotate in the same direction. Usually the winding interval corresponds to twice the inversion pitch P. The inversion pitch P is preferably between 0.5 m and 5 m.

Figure 5:
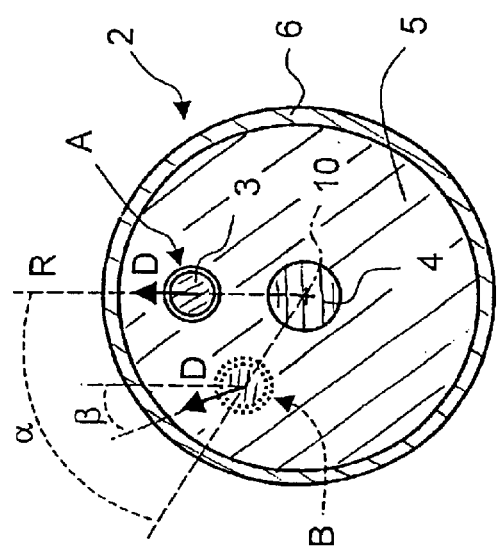
FIG. 5 shows the positions occupied by the same optical fibre in two sections of the optical core according to FIG. 2, arranged next to each other.

Each optical fibre 3 has, along the SZ trajectory defined by it, an alternate twist about its axis. With reference to FIGS. 4 and 5, A and B denote the positions assumed by the same optical fibre 3 in the optical core 4 in two longitudinal sections of the optical core 4 itself, located close to each other. As shown in FIG. 5, taking the position A as being the reference position, the position B has, associated with it, a winding angle $\alpha$ equal to the rotation which the optical fibre 3 performs about the axis 10 in order to pass from the position A to the position B. Moreover, each optical fibre 3 may have associated with it, a radial reference direction D which is integral with the optical fibre 3 itself and the angle $\beta$ which with respect to a fixed reference direction R (which, in position A, coincides with the radial reference direction D) indicates the torsion performed by the optical fibre 3 about its axis. In the case where the torsion of the optical fibre 3 is imparted, associated with the SZ cording of the optical fibre 3 in the optical core 2 (the associated reel 62 being kept stationary), at any point along the trajectory $|\beta| \leq |\alpha|$ and the maximum values of the two angles satisfy the relation $|\beta_{max}| < |\alpha_{max}|$. As stated above, $|\alpha_{max}|$ is preferably less than or equal to 360°.

In addition to the angle of torsion $\beta$, it is possible to define a local torsion corresponding to $d\beta/dx$ (which can be expressed in rad/m or, in an equivalent manner, in turns/m, namely number of turns of the optical fibre 3 about its axis per unit of length) where x is a spatial abscissa measured along the axis 10, and a mean torsion, equal to the mean value of the local torsion in a winding interval p.

In the cable 1, the local torsion of the optical fibres 3 assumes a maximum value of between 0.05 turns/m and 1.5 turns/m, preferably, between 0.1 turns/m and 1 turn/n.

The fact that the angle of torsion $\beta$ is variable and, in terms of absolute value, less than or equal to the winding angle $\alpha$, represents an advantage id in terms of PMD since it is able to prevent the same surface portion of an optical fibre 3 from being subjected to continuous or periodic stresses. In fact, in the case where the core 2 is subjected to radial stresses distributed uniformly in an angular direction, the fact of having an angle $\alpha$ coinciding with the angle $\beta$ would constitute a disadvantage since the stresses would always be directed along the same external portion of the optical fibre 3. In the case where, on the other hand, the core 2 is subjected to direct stresses mainly in a single direction it would be disadvantageous both to have an angle $\beta$ fixed and equal to 0° and to have an angle $\beta$ variable and equal to $\alpha$. In fact, in this case as well, the stresses would act periodically always on the same portion of the optical fibre 3 or on the diametrically opposite portion, causing in both cases a birefringence of the optical fibre 3 itself and, therefore, an increase in the PMD. In the cases where the stresses have elements of both types, both the abovementioned conditions would be unfavorable.

A further advantage in terms of PMD is provided by the particular type of winding used. In fact, owing to the use of a winding of the SZ type, each optical fibre 3 has, in a cable portion 1, with a length equal to an even multiple of the inversion pitch P, a zero mean torsion. Therefore, the elastic torsional component of the optical fibre 3, which is generally responsible for an increase in the circular birefringence (and hence the PMD), is on average zero in the case of the cable 1.

With reference to FIG. 6, 20 denotes, in its entirety, an apparatus for manufacturing the optical core 2 (or 2'). The apparatus for the successive processing steps, in particular for obtaining the cable 1 from the optical core 2, are not described in that they are known.

The apparatus 20 comprises, in terms of its essential parts, an unwinding and supply section 21, an extrusion section 22 and a storage section 23. These sections are arranged consecutively in a substantially linear working direction 30.

The supply section 21 comprises a unit 24 supplying the central element 4 and a plurality of units 25 supplying the optical fibres 3, said units being designed to operate simultaneously so as to supply the central element 4 and the optical fibres 3 to the extrusion section 22.

The unit 24 comprises:
- a reel 26 for unwinding the central element 4, which has the central element 4 wound around it and is arranged with its axis of rotation perpendicular to the working direction 30;
- a cushioning device 27 of the known type for adjusting the unwinding tension of the central element 4; and
- a twisting device 28 which is arranged along the working direction 30 and is designed to receive, by means of the cushioning device 27, the central element 4 from the reel 26.

The twisting device 28 is, in particular, designed to impart to the central element 4 a controlled twist of the SZ type which is able to achieve, as described below, the particular arrangement of the optical fibres 3 already described. A preferred embodiment of the twisting device 28 is described below with reference to FIG. 7.

The twisting device 28 comprises a fixed support structure 29 (shown only partially) and a motor-driven rotating member 31 (enclosed within the broken lines) which is mounted on the support structure 29.

The rotating member 31 has an axis of rotation 43 substantially aligned with the working direction 30 (along which the central element 4 is supplied at a constant speed) and comprises a frame 32 and two pairs of rollers 33 and 34 supported by the frame 32. Each pair of rollers 33, 34 includes a first and a second roller 45, 46 mounted idle on opposite sides of the axis of rotation 43 and co-operating with each other, as described below, so as to guide the central element 4.

The frame 32 comprises a first and a second annular element 35, 36, the respective axes of which are arranged along the working direction 30 and which are integrally joined by means of longitudinal plates 37. The first annular element 35 is integrally connected to a tooth pulley 38, which is, in turn, connected, via a toothed belt 39, to a toothed pulley 40 actuated by a motor 41. The second annular element 36 is designed to allow integral engagement with the rotating member 31 of another member of the same type, should the twisting action of the twisting device 28 not be properly ensured by a single rotating member 31. Even in the case where the twisting device 28 comprises a further rotating member in addition to that shown in FIG. 7, the rotation may in any case be imparted by a single motor, i.e. in the case in question the motor 41.

The frame 32 also comprises a lever system 42 for connecting, to the first annular element 35, the first rollers 45 of each pair and, separately, the second rollers 46 of each pair. The lever system 42 allows self-centring of the pairs of rollers 33, 34 on the central element 4 during the working process.

Figure 8:
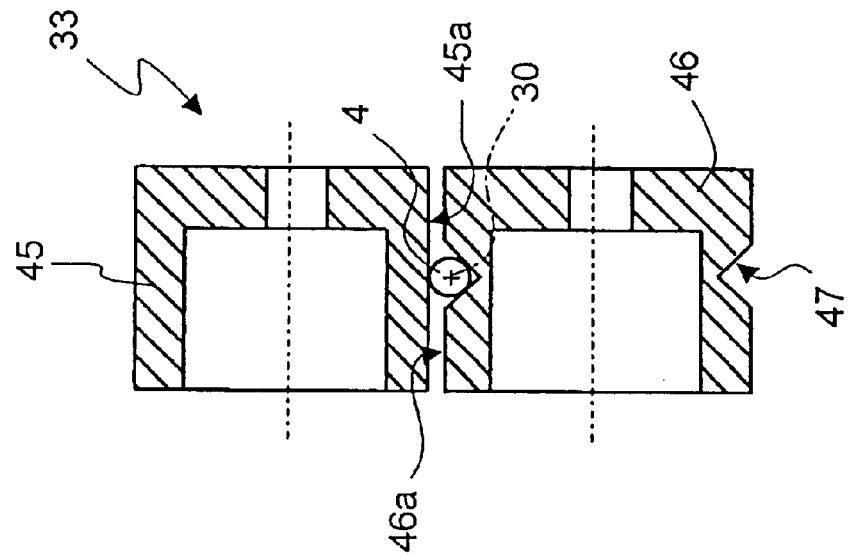
FIG. 8 is a cross-section, shown not to scale and with parts removed for the sake of clarity, of the device according to FIG. 7 along the plane VIII—VIII.

As shown in the cross-sectional view in FIG. 8, the first and the second rollers 45 and 46 of each pair are arranged with their respective axes parallel to each other and perpendicular to the working direction 30 and have respective surfaces 45a, 46a which are substantially cylindrical. The second roller 46 has, on its cylindrical surface 46a, a circumferential groove 47 which, for example, has a V-shaped cross-section and is designed to house the central element 4 as it passes through the twisting device 28. The two rollers of each pair 33, 34 are preferably joined by a resilient connecting element (not shown), for example a spring, which is designed to move the rollers themselves towards each other so that, when the groove 47 receives the central element 4, the cylindrical surface 45a of the first roller 45 forces the central element 4 itself inside the groove 47.

FIG. 9 shows a twisting device 50 which constitutes a possible variation of the twisting device 28. The twisting device 50 comprises a pulley 51 provided with a race 52 for guiding the central element 4. The pulley 51 is free to rotate about its axis with respect to a bracket 53 which extends radially projecting from a hollow shaft 54. The latter is arranged with its axis along the working direction 30, is supported rotatably about said axis (by means of a structure not shown) and has a first end 54a for the entry of the central element 4 supplied by the reel 26 and a second end 54b for discharging the central element 4 after the latter has performed a rotation about the pulley 51. In order to allow the supply of the central element 4 to the pulley 51, the hollow shaft 54 has an opening 55 through which a portion of the pulley 51 extends inside the through-cavity defined by the hollow shaft 54 itself, so that the race 52 is tangential to the working direction 30.

A toothed pulley 56 is keyed onto the hollow shaft 54. A toothed belt 57 engages with the toothed pulley 56 and with another toothed pulley 58 connected to a motor 59 of the type capable of imparting an alternating rotary movement to the toothed pulley 58 and, therefore, by means of the belt 57 and toothed pulley 56, an alternating rotary movement to the hollow shaft 54. An alternating twisting movement is therefore imparted to the central element.

Again with reference to FIG. 6, each supply unit 25 comprises a reel 60 for unwinding a respective optical fibre 3, a cushioning device 61 of the known type for adjusting the unwinding tension of the optical fibre 3 and a drive pulley 62 designed to supply the optical fibre 3 to the extrusion section 22 in a predetermined direction.

The reels 60 and the cushioning devices 61 may be supported by the same support structure (not shown) positioned laterally with respect to the working direction 30. In particular, the reels 60 are supported with their respective axes parallel to each other and perpendicular to the working direction 30. Each cushioning device 61 is designed to receive a respective optical fibre 3 from the corresponding reel 60 and supply it to the corresponding drive pulley 62 obliquely with respect to the working direction 30.

With reference to FIG. 10, the drive pulleys 62 are supported in idle fashion around the working direction 30, with their respective axes substantially parallel to each other. The drive pulleys 62 may, for example, be mounted on a fixed support (not shown) having an opening through which the central element 3 passes. The pulleys 62 are located at a distance L from an extrusion zone defined below. The distance L represents a process parameter which is chosen on the basis of the characteristics to be conferred on the optical core 2, as will be explained below.

The extrusion section 22 comprises, in the working direction 30, a first extruder 65 designed to extrude the polymer layer 5 around the central element 4 and the optical fibres 3 and a first cooling tank 66 for cooling the polymer layer 5 after extrusion. Moreover, the extrusion section 22 comprises a second extruder 84 positioned downstream of the first cooling tank 66 for depositing onto the polymer layer 5 the sheath 6 and a second cooling tank 85 for consolidating the material forming the sheath 6 itself. A hot-air drying device 82 is provided between the first cooling tank 66 and the second extruder 84, in order to eliminate traces of moisture present on the surface of the layer of polymer material 5.

FIG. 11 shows an extrusion head 65a which forms part of the extruder 65 and inside which extrusion of polymer material onto the central element 4 and onto the optical fibres 3 is performed. The extrusion head 65a comprises, in a fixed position, a first cylindrical body 67 defining a female mould and a second cylindrical body 68 defining a male mould, said moulds having a common axis 76 aligned along the working direction 30. The female mould 67 is formed internally substantially in the manner of a funnel and the male mould 68 extends inside the female mould 67 and defines, together with the latter, a substantially annular passage 75 for the polymer material. The passage 75 converges towards an extrusion zone 77 where the optical core 2 is formed.

The extrusion zone 77 extends inside a cylindrical opening 72 of the female mould 67, which is coaxial with the axis 76 and is designed to allow the optical core 2 to leave the extrusion head 65a. The diameter envisaged for the opening 72 is approximately equal to the diameter of the optical core 1 and its length (referred to in the art by the term "land") is related to the process parameters such as the feed speed v of the central element 4 and the dimensions of the optical core 2 and is chosen so as to produce a predetermined pressure of the polymer material in the extrusion zone 77. Moreover, the abovementioned length must be such as to allow the polymer material to be distributed uniformly about the central element 4 and to incorporate the optical fibres 3 in a stable position before leaving the extrusion head 65a. Preferably, the length of the opening 72 is between 2 mm and 6 mm, its diameter is between 2 mm and 4 mm and the ratio between the length and diameter is preferably between 1 and 2 and, more preferably, between 1.3 and 1.5.

The male mould 68 comprises a central body 69 which has a substantially cylindrical tubular shape and is designed to guide the central element 4 and the optical fibres 3 towards the extrusion zone 77. The shape and the dimensions of the central body 69 are chosen on the basis of the intended characteristics of the optical core 2. In particular, the central body 69 shown in FIG. 11 is designed to provide an optical core 2 comprising a single ring of optical fibres 3.

With reference to FIGS. 11 and 12, the central body 69 is arranged so as to be coaxial with the axis 76 and has a longitudinal central hole 70 through which the central element 4 passes and a plurality of substantially longitudinal equidistant channels 71 through which the optical fibres 3 pass. The central body 69 may be removed from the extrusion head 65a so as to allow easy insertion of the central element 4 into the hole 70 and the optical fibres 3 into the channels 71 before the start of the working process.

A first end 73 of the central body 69 defines an extension of the male mould 68 which extends inside the extrusion zone 77 and terminates, with a chamfer, inside the opening 72. A second end 74 of the central body 69, opposite to the first end, has an annular projection 81 which is arranged so as to abut against a shoulder 78 of a fixed portion 79 of the male mould 68. A closing element 80 with a cylindrical tubular shape is arranged so as to abut against the second end 74 on the opposite side with respect to the shoulder 78 and is designed, together with the latter, to axially lock the central body 69. The closing element 80 is provided with a longitudinal opening (not shown) so as to allow application thereof around the central element 4 before being inserted into the male mould 68 and is provided with an external threading for a threaded engagement with a fixed portion 79 of the male mould 68.

The channels 71 extend from the second end 74 to the start of the first end 73, being substantially parallel to one another and located at a distance from the axis 76 which is substantially equal to the external diameter of the first end 73 so as to allow the optical fibres 3 to enter into the extrusion zone 77 in contact with the external surface of the first end 73 itself. The external diameter of the first end 73 is substantially equal to the distance envisaged between the optical fibres 3 and the axis 10 of the optical core 2 and its length is chosen so as to keep the optical fibres 3 at a constant distance from the axis 76 while the optical fibres 3 pass through the extrusion zone 77, thus preventing the optical fibres 3 themselves from collapsing radially towards the central element 4 owing to the radial pressure of the polymer material.

Each channel 71 has a height (measured radially with respect to the axis 76) progressively decreasing from the second end 74 towards the first end 73 so that it is possible to define an angle of convergence γ of its outermost wall towards its innermost part, which is not equal to zero. The angle of convergence γ is preferably greater than the angle (with respect to the axis 76) at which the optical fibres 3 are supplied to the extrusion head 65a by the drive pulleys 62. For example, the angle of convergence γ may be equal to 3° and the angle of supply of the optical fibres is equal to 1.5°. Each channel 71 terminates in a cross-section approximately equal to the cross-section of the optical fibres 3 so as to ensure that the optical fibres 3 themselves enter into the extrusion zone 77 in contact with the first end 73 itself. The central body 69 has, for example, a length of 15 mm.

Figure 3:
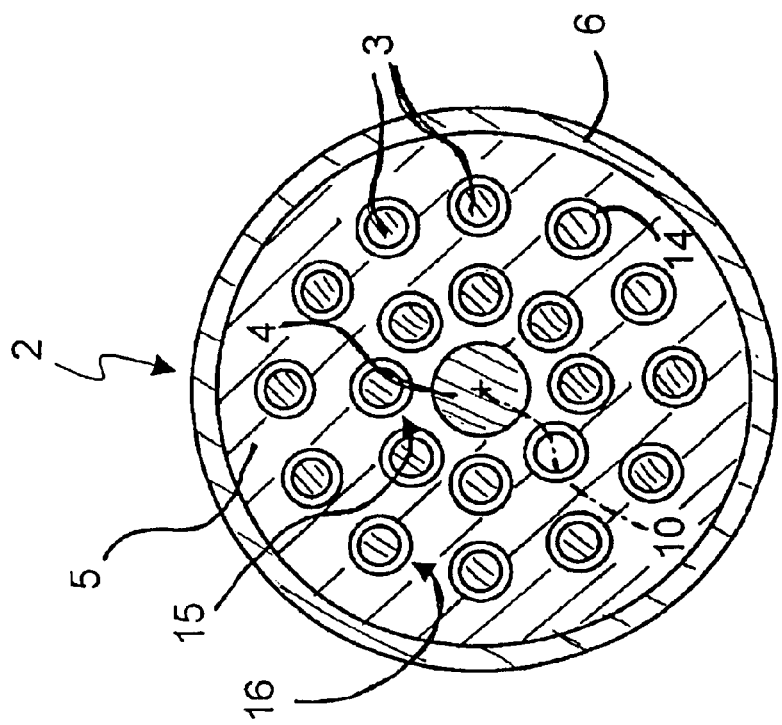
FIG. 3 shows a cross-sectional view of a possible variation of the optical core according to Figure 2.

FIGS. 13 and 14 show a different embodiment of the central body which is indicated here by 69' and is designed for the case where the optical fibres 3 are to be arranged as two different rings, as shown in FIG. 3. The parts of the central body 69' corresponding to similar parts of the body 69 are indicated by the same reference numbers. The central body 69' contains a first and a second plurality of channels 71', 71", the second plurality of which is outside the first one. The first plurality of channels 71' is designed to allow the arrangement, around the central element 4, of a first plurality of optical fibres 3 defining the first ring 15 shown in FIG. 3 and the second plurality of channels 71" is designed to allow the arrangement, around the central element 4, of a second plurality of optical fibres 3 defining the second ring 16 shown in FIG. 3. Moreover, the central body 69' has a first end 73' extending inside the extrusion zone 77 and comprising a first longitudinal portion 73a and a second longitudinal end of portion 73b having an external diameter smaller than that of the first longitudinal portion 73a. The central body 69' has, for example, a length of 18 mm.

Again with reference to FIG. 6, the tank 66 is arranged along the working direction 30 and is designed to receive, during the working process, the optical core 2 from the extruder 65. The tank 66 has a length chosen on the basis of the type of polymer material used to form the layer 5 and the feed speed v of the optical core 2. The tank 66 is preferably divided into successive zones containing water at predetermined temperatures and is designed to allow the optical core 2 to pass through the whole of its length.

The second extruder 84, which is designed to form the sheath 6, is not described here in that it is known. The second cooling tank 85 is, for example, of the same type as the tank 66.

The storage section 23 comprises a pulling device 86 of a known type, for example a pulling device comprising continuous slides or of the capstan type designed to pull the optical core 2 at a controlled speed v.

The storage section 23 also comprises a storage reel 87 which is motor-driven and designed to receive and store the optical core 2 and a cushioning device 88 arranged upstream of the storage reel 87 and designed to adjust the tension on the optical core 2.

With reference to FIG. 15, 90 denotes, in its entirety, a further apparatus used to simulate the effects of the subsequent cabling steps carried out on the optical core 2, so as to be able to perform, on the optical core 2, PMD measurements which simulate similar measurements carried out on a finished cable 1. Since, in a finished cable 1, the Warrington structure defined by the cylindrical elements 7a, 7b, and 7c is self-supported and, therefore, does not mechanically stress the optical core 2, the effects on the core 2 of the subsequent cabling steps essentially consist of the thermal effects following the deposition of the layer 13 of polymer material. These thermal effects comprise expansion of the polymer material of the layer 5 during heating for application of the layer 13 and shrinkage of this material during subsequent cooling.

The apparatus 90 comprises a reel 91 which has, wound around it, the optical core 2, for example, corresponding to the storage reel 87 shown in FIG. 6, an oven 92 which is designed to receive the optical core 2 from the reel 91 by means of a cushioning device 93 and a drive pulley 94, a heated tube 95 arranged downstream of the oven 92 and a storage reel 96 designed to receive the optical core 2 by means of a further drive pulley 97 and a further cushioning device 98. The temperature inside the oven 92 and that inside the heated tube 95 are chosen as to heat the optical core 2 to a temperature corresponding to that typically reached during application of the layer 13 (FIG. 1). For example, this temperature may be equal to about 100° C. The line speed (i.e. the feeding speed of the optical core 2) and the length of the heated tube 95 are chosen so as to provide a thermal variation in the optical core, 2 which is similar to that occurring during application of the layer 13.

Below, a process for the manufacture of the optical core 2 by means of the manufacturing apparatus 20 shown in FIG. 6 is described.

Owing to the pulling force exerted by the pulling device 86, the central element 4 is unwound from the unwinding reel 26 and, at the same time, the optical fibres 3 are unwound from the respective reels 60. The cushioning device 27 and the cushioning devices 61 adjust in a controlled manner the tension acting on the central element 4 and, respectively, on the optical fibres 3. The tensions applied onto the optical fibres 3 have values preferably of between 100 g and 300 g and, more preferably, of between 150 g and 250 g. Advantageously, the ratio between the tension applied to the central element 4 and the tension applied to the optical fibres 3 is between 10 and 50. This ratio is chosen so that, inside the optical core 2, the optical fibres 3 have a residual elongation greater than that of the central element 4. In particular, the difference between the residual elongation of the optical fibres 3 and that of the central element 4 is preferably greater than 0.02%. Owing to the presence of a residual elongation in the optical fibres 3, it is possible to compensate for any compression of the optical fibres themselves occurring during subsequent stages of the working process (for example during winding onto the reel) or during use of the finished cable. These compressions could, in fact, cause a deterioration in terms of attenuation of the transmitted signal.

The central element 4, before reaching the extruder 65, undergoes twisting by the twisting device 28. In particular, with reference to FIG. 7, the twisting device 28 subjects the rotating member 31 to an alternating rotary movement about the axis 43 with a predetermined maximum angle of rotation $\alpha'_{max}$ and predetermined angular velocity $\omega$. The twisting action on the central element 4 is performed by the pairs of rollers 45, 46 inside each of which the central element 4 itself is kept pressed inside the groove 47 of the second roller 46 by the surface 45a of the first roller 45.

The extrusion head 65a receives the central element 4 from the twisting device 28 and the optical fibres 3 from the drive pulleys 62. Inside the extrusion head 65a, the central element 4 passes through the hole 70 of the central body 69 until it enters into the extrusion zone 77. At the same time, the optical fibres 3 pass through the channels 71 of the central body 69 and enter into the extrusion zone 77 in contact with the external surface of the first end 73. In the extrusion zone 77, the polymer material emerging from the passage 75 first of all comes into contact with the external surface of the first end 73 and then flows from the end chamfer of the first end 73 as far as the central element 4, enveloping both the latter and the optical fibres 3. Owing to the physical characteristics of the polymer material chosen and the controlled tension on the optical fibres 3 imparted by the cushioning devices 61, the optical fibres 3 themselves are kept equidistant from each other and at a predetermined distance from the central element 4.

Starting from the exclusion zone 77, owing to the alternate twisting action imparted to the central element 4 by the twisting device 28, the polymer material and the optical fibres 3 are made to perform an alternating rotary movement about the axis 76, with a winding angle substantially equal to the angle of torsion of the central element. Owing to this rotary movement and the constant feeding speed in the working direction 30, the fibres 3 are arranged, equidistant from each other, along SZ-type trajectories. The inversion pitch P of these SZ trajectories is determined by the above-mentioned feeding speed and by the time interval of the abovementioned twisting movement of the central element 4.

During twisting of the central element 4 in the time interval between two consecutive inversion instants, each optical fibre 3 undergoes, in addition to the abovementioned winding action about the central element 4 itself, a twisting action about its axis. As already described with reference to FIG. 5, the angle of torsion $\beta$ is smaller, in terms of absolute value, than the winding angle $\alpha x$. This is due to the torsional constraint imposed by the drive pulley 62. In fact, since the torsion imparted to each optical fibre 3 in the extrusion zone 77 is transmitted to the portion of optical fibre 3 which is yet to enter into the extrusion zone 77 and since the torsion at the respective drive pulley 62 is zero, a torsion is accumulated, alternately in both directions, between the drive pulley 62 and the extrusion zone. As the optical fibre 3 is fed in the extrusion zone 77, the accumulated torsion is subtracted from the torsion imparted (by the central element 4) and the resultant torsion on the optical fibre 3 is therefore less than the torsion of the central element 4.

The maximum local torsion which may be applied to the optical fibres 3 depends on the distance L of the drive pulleys 62 from the extrusion zone 77, the feed speed v in the working direction 30, the angular torsional speed $\omega$ and the maximum angle of rotation $\alpha'_{max}$ of the twisting device 28. In particular, reducing the distance L increases the torsion per unit of length accumulated on the optical fibres 3 between the pulleys 62 and the extrusion zone 77, while increasing L has the opposite effect. The distance of the pulleys from the extrusion zone 77 and the parameters indicated above may therefore be adjusted depending on the desired maximum local torsion of the optical fibres 3.

According to a possible variation not shown, the pulleys 92 may be motor-driven so as to apply to the optical fibres 3 a controlled torsion substantially independent of the torsion of the optical fibres 3 themselves conferred by means of twisting the central element 4.

The optical cable 2 leaving the extruder 65 is supplied to the first cooling tank 66 where the optical core 2 is cooled so as to stabilize the polymer material of the layer 5 and, inside it, the optical fibres 3.

When the optical core subsequently passes through the second extruder 84 and the second cooling tank 85, the sheath 6 is applied (in a known manner). The optical core 2 provided with the sheath 6 is then wound, after passing over the pulling device 86 and over the cushioning device 88, onto the storage reel 87.

Experimental Results

The manufacturing apparatus 20 (FIG. 6) was used to produce optical cores 2 of different types, the main characteristics of which are shown in the following Table 1 where Ref. indicates the reference code associated with each optical core, N the number of optical fibres 3 present in the optical core, v the feeding speed in the working direction 30 imparted by the pulling device 86, P the winding pitch (equal to twice the inversion pitch P) and $\alpha_{max}$ the maximum winding angle.

TABLE 1

| Ref. | N | V(m/min) | P (mm) | $\alpha_{max}$ |
|------|---|----------|--------|----------------|
| SZ1  | 4 (Fos) | 20 | 1200 | 200° |
| SZ2  | 8 (4 Fos + 4 Lucent) | 20 | 1200 | 200° |
| SZ3  | 8 (Fos) | 20 | 800 + 1000 | 720° |
| SZ4  | 8 (Fos) | 20 | 1000 | 360° |
| SZ5  | 8 (5 Fos + 3 Lucent) | 50 | 1500 | 360° |

The optical cores 2 according to Table 1 were produced from optical fibres 3 of the NZD type (non zero dispersion) suitable for applications in telecommunications systems of the DWDM type. In particular, as shown in Table 1, optical fibres of the first type produced by the company Fos and distinguished by the trade name FOAS and fibres of a second type produced by the company Lucent and distinguished by the trade name TrueWave® were used. The optical fibres 3 used have an external diameter of about 255 μm and have a first acrylic lining and a second coloured acrylic lining with a thickness of about 6 μm.

The central element 4 used for production of the optical cores 2 is made of steel and has an external diameter of about 0.65 mm.

The polymer material used for manufacture of the polymer layer 5 is of the type Hytrel® G3548 and has a Melt Flow Index of 10 and a Shore D hardness factor of 35.

The process parameters, common to all the individual processes for obtaining the optical cores 2 according to Table 1, are described below.

The cushioning devices 27 and 61 were adjusted so as to obtain a tension on the central element 4 equal to about 5 kg and, respectively, a tension on the optical fibres 3 of about 200 g.

The drive pulleys 62 were positioned so as to obtain an angle of supplying the optical fibres 3 to the extruder 65, measured with respect to the working direction 30, of about 1.5°.

The dimensional parameters of the extruder 65 (FIG. 11) are as follows:

diameter of opening 72: 2.9 mm;

length of opening 72: 4 mm;

length of central body 69: 15 mm;

external diameter first end 73 of the central body 69: 1.8 mm.

Moreover, the pressure at which the polymer material is injected into the extrusion zone 77 through the channels 75 was chosen as to be equal to about 40 bar and the extrusion temperature of the polymer material was chosen to be equal to about 240° C. In the cooling tank 66 the water temperature was kept at about 70° C.

For a direct comparison with other manufacturing technologies, optical cores of different types were produced using the same materials and the same fibres 3 used for manufacture of the optical cores according to Table 1. A first type of optical core different from that according to the invention was manufactured by means of extrusion, onto a central element, of a single polymer layer in which the fibres are arranged parallel to each other. The optical cores produced in accordance with the above-mentioned technique will be indicated by the term OS (one shot) followed by a progressive number. In particular, an optical core OS2 comprising the same optical fibres as the optical core SZ2 and an optical core OS3 comprising the same optical fibres as the optical cores SZ3 and SZ4 were manufactured using this technique.

A second type of optical core different from that according to the invention was manufactured using a technique corresponding to that described in the patent application EP 97121295.6 filed on 4 Dec. 1997 in the name of the same Applicant. This technique envisages the deposition of the optical fibres tangentially with respect to a support which has been lined beforehand and pre-heated to a suitable temperature and parallel to the axis of this support. The optical cores produced in accordance with the abovementioned technique will be indicated below by the term DPS followed by a progressive number. In particular, with this technique an optical core DPS1 comprising the same optical fibres as the optical core SZ1, an optical core DPS2 comprising the same optical fibres as the optical core SZ2 and an optical core DPS3 comprising the same optical fibres as the optical cores SZ3 and SZ4 were made using this technique.

In order to verify the effects of cabling in terms of PMD, a sample of each optical core, having a length of 900 m, was subjected, prior to measurement of the PMD, to processing using the apparatus 90 (FIG. 15) which is able to simulate the effects of cabling. This processing operation was performed using portions of optical cores with a length of 900 m.

Processing with the apparatus 90 was carried out under the following conditions:

pulling force during unwinding: 3 kg;

pulling force during storage: 3 kg;

line speed: 2.5 m/min;

temperature inside oven 92: 100° C.; and storage diameter on reel 96 (single winding): 1 m.

In order to be able to verify, during subsequent PMD measurements, the influence of the thermal effects of cabling alone, further samples of each optical core having a length of 900 m and equal to the preceding samples were stored on a reel after being passed through the apparatus 90 with the oven 92 switched off, while maintaining a room temperature of about 20° C. and the following conditions:

pulling force during unwinding: 3 kg;

pulling force during storage: 3 kg;

line speed: 10 m/min; and storage diameter on reel 96 (single winding): 1 m.

Each sample prepared using the two methods described, after being stored on a reel, underwent measurement of the PMD. The measurements of the PMD on samples subjected to treatment at 100° C. will be indicated below by [100° C.], while the measurements carried out on samples stored at 20° C. will be indicated below by [20° C.].

All the PMD measurements were carried out at the wavelength of 1550 nm, using an interferometer for measurement of the PMD, model IQ 206 manufactured by the company EXFO, comprising:

a source IQ 2100;

a selector IQ 5550; and an analyser 5500.

The results of the PMD measurements are shown in Table 2, 3 and 4 below, in which the optical cores comprising the same type of optical fibres have been grouped together. In particular, the mean and maximum values for the PMD of the optical fibres used and the mean and maximum values for the measurements [20° C.] and [100C.] are shown in each of Tables 2, 3 and 4. For the purposes of the present patent, the PMD values of the optical fibres are values measured on an optical fibre portion having a length of 1 km and wound onto a reel with a zero pulling force and in a single layer.

TABLE 2

| Ref. | PMD mean fibre | PMD max fibre | PMD mean core [20° C.] | PMD max core [20° C.] | PMD mean core [100° C.] | PMD max core [100° C.] |
|---|---|---|---|---|---|---|
| SZ1 | 0.77 | 0.1 | 0.068 | 0.074 | 0.089 | 0.118 |
| DPS1 | 0.77 | 0.1 | 0.082 | 0.104 | 0.16 | 0.179 |

TABLE 3

| Ref. | PMD mean fibre | PMD max fibre | PMD mean core [20° C.] | PMD max core [20° C.] | PMD mean core [100° C.] | PMD max core [100° C.] |
|---|---|---|---|---|---|---|
| SZ2 | 0.058 | 0.1 | 0.067 | 0.081 | 0.083 | 0.14 |
| OS2 | 0.058 | 0.1 | 0.083 | 0.127 | 0.167 | 0.331 |
| DPS2 | 0.058 | 0.1 | 0.095 | 0.143 | 0.124 | 0.157 |

TABLE 4

| Ref. | PMD mean fibre | PMD max fibre | PMD mean core [20° C.] | PMD max core [20° C.] | PMD mean core [100° C.] | PMD max core [100° C.] |
|---|---|---|---|---|---|---|
| SZ3 | 0.065 | 0.08 | 0.06 | 0.066 | 0.055 | 0.057 |
| SZ4 | 0.065 | 0.08 | Not recorded | Not recorded | 0.06 | 0.067 |
| OS3 | 0.065 | 0.08 | 0.063 | 0.078 | 0.127 | 0.227 |
| DPS3 | 0.065 | 0.08 | 0.088 | 0.153 | 0.092 | 0.105 |

From an examination of the results shown in Tables 2, 3 and 4 it can be seen that the optical cores produced in accordance with the present invention have a significantly improved performance in terms of PMD compared to optical cores manufactured using the other techniques mentioned. From a comparison of the tests carried at 20° C. and those carried out at 100° C., moreover, it emerges that the effect of structural shrinkage of the optical core following heat treatment at 100° C. is of a particularly limited nature. Moreover, it may be noted that winding angles greater than 360° do not significantly improve the results which are obtained with angles of about 360°.

Further PMD measurements were carried out on optical cables of the type shown in FIG. 1 obtained from optical cores of the SZ2 and SZ5 type and indicated by CABLE$_{SZ2}$ and CABLE$_{SZ5}$. The PMD values measured are shown in Table 5 below.

TABLE 5

| Ref. | PMD mean fibre | PMD max fibre | PMD mean cable | PMD max cable |
|---|---|---|---|---|
| CAVO$_{SZ2}$ | 0.058 | 0.100 | 0.062 | 0.103 |
| CAVO$_{SZ5}$ | 0.052 | 0.075 | 0.028 | 0.043 |

The results of Table 5 confirm the results obtained previously. In particular, from the data shown in Table 5 it can be seen that the PMD measured on a cable according to the invention is less than 110% of the PMD measured on a non-cabled optical fibre of the same type as those used in the cable.

FIG. 16 shows the results of measurements of the spectral attenuation of the signal carried out with the method known in the art as the cut-back method, using a Photon Kinetics instrument, model 2200. The curve 101 relates to the mean values recorded during measurements carried out on Fos and Lucent non-cabled optical fibres which are of the same type as that used for manufacture of the optical cores according to the invention. The curve 102 relates to the mean values recorded during several measurements carried out on a cable manufactured in accordance with the invention. The curve 103 relates to the mean values recorded during several measurements carried out on a cable manufactured with two layers of polymer material and tangential deposition (DPS cable).

As can be seen, with the cables manufactured in accordance with the invention it is possible, on average, to obtain attenuation values which are lower than and closer to those for non-cabled optical fibres compared to cables manufactured with a double layer and tangential deposition.

What is claimed is:

1. An optical cable for telecommunications comprising a substantially strand-like central element, at least one optical fibre and a layer of polymer material which is substantially devoid of discontinuities and incorporates said central element and said optical fibre, said optical fibre being arranged along an open helix trajectory and having a torsion chosen so that the PMD measured on said cable is less than 110% of the PMD measured on a non-cabled optical fibre of the same type.

2. An optical cable according to claim 1, wherein said optical fibre has, along the respective open helix trajectory, a maximum local torsion of between 0.05 turn/m and 1.5 turns/m.

3. An optical cable according to claim 1 wherein said optical fibre has, along the respective open helix trajectory, a maximum local torsion of between 0.1 turn/m and 1 turn/m.

4. An optical cable according to claim 1, wherein said optical fibre has, along the respective open helix trajectory, a zero mean torsion.

5. An optical cable according to claim 1, comprising a number of optical fibres ranging between 2 and 24.

6. An optical cable according to claim 1, wherein said optical fibre has, along the respective open helix trajectory, a maximum winding angle ($\alpha_{max}$) which is less than or equal to, in terms of absolute value, 360° and a maximum angle of torsion ($\beta_{max}$) smaller than, in terms of absolute value, said maximum winding angle.

7. An optical cable according to claim 6, wherein said maximum angle of torsion ($\beta_{max}$) is between 90° and 270°.

8. An optical cable according to claim 6, wherein a thickness of homogenous polymer material greater than or equal to 0.10 mm is provided around said optical fibre.

9. An optical cable according to claim 1, wherein said open helix trajectory has an inversion pitch (P) of between 0.5 m and 5 m.

10. An optical cable according to claim 1, comprising a plurality of optical fibres defining a ring of optical fibres which are equidistant from each other and arranged at the same distance from an axis of said cable.

11. An optical cable according to claim 10, wherein said distance of said optical fibres from said axis is between 0.4 mm and 1.2 mm.

12. An optical cable according to claim 1, comprising a plurality of optical fibres defining a first ring of optical fibres which are equidistant form each other and arranged at a first distance from an axis of said cable and a second ring of optical fibres which are equidistant from each other and arranged at a second distance from said axis which is greater than said first distance.

13. An optical cable according to claim 12, wherein said first distance is between 0.4 mm and 0.8 mm and said second distance is between 0.9 mm and 1.2 mm.

14. An optical cable according to claim 1, wherein said layer of polymer material has a thickness of between 0.9 mm and 1.5 mm.

15. An optical cable according to claim 1, wherein said central element has a diameter of between 0.5 mm and 0.7 mm.

16. An optical cable according to claim 1, wherein said optical fibre has an external diameter of less than 400 $\mu$m.

17. An optical cable according to claim 1 wherein said optical fibre has an external diameter of less than 270 µm.

18. An optical cable according to claim 1, wherein said polymer material has a bending modulus of between 20 Mpa and 70 Mpa, a Shore D hardness factor of between 15 and 70 and a Melt Flow Index of between 5 and 15.

19. An optical cable according to claim 1, comprising a sheath arranged around said layer of polymer material, said sheath being made of a material selected from polyalkylene terephthalates, polyolefins and polyamides.

* * * * *

UNITED STATES PATENT AND TRADEMARK OFFICE
CERTIFICATE OF CORRECTION

PATENT NO.    : 6,853,780 B1
DATED         : February 8, 2005
INVENTOR(S)   : Giovanni Brandi et al.

It is certified that error appears in the above-identified patent and that said Letters Patent is hereby corrected as shown below:

Title page,
Item [57], ABSTRACT
Line 6, "ranged" should read -- arranged --.
Line 9, "1 turns/m." should read -- 1.5 turns/m. --.

Column 22,
Line 52, "form" should read -- from --.

Signed and Sealed this

Thirtieth Day of August, 2005

JON W. DUDAS
*Director of the United States Patent and Trademark Office*